US008734163B1

(12) United States Patent (10) Patent No.: US 8,734,163 B1
Gordin et al. (45) Date of Patent: May 27, 2014

(54) APPARATUS, METHOD, AND SYSTEM FOR ON-SITE EVALUATION OF ILLUMINATION SCHEME USING A MOBILE LIGHTING EVALUATION SYSTEM

(75) Inventors: Myron Gordin, Oskaloosa, IA (US); Matthew D. Drost, Oskaloosa, IA (US); Joel D. Rozendaal, Lynville, IA (US); Brian P. Wan, Pella, IA (US); Ross A. McCombs, Oskaloosa, IA (US); Bradley W. Lepley, Newton, IA (US); Andrew J. Schembs, Des Moines, IA (US)

(73) Assignee: Musco Corporation, Oskaloosa, IA (US)

( * ) Notice: Subject to any disclaimer, the term of this patent is extended or adjusted under 35 U.S.C. 154(b) by 844 days.

(21) Appl. No.: 12/604,572

(22) Filed: Oct. 23, 2009

Related U.S. Application Data

(60) Provisional application No. 61/173,486, filed on Apr. 28, 2009.

(51) Int. Cl.
*G09B 25/00* (2006.01)
(52) U.S. Cl.
USPC .......................................................... 434/367
(58) Field of Classification Search
USPC ........................... 434/365, 367; 362/227, 234
See application file for complete search history.

(56) References Cited

U.S. PATENT DOCUMENTS

| | | | |
|---|---|---|---|
| 2,060,585 A | 11/1936 | Miller | |
| 2,174,848 A * | 10/1939 | Stahmer | 198/339.1 |
| 2,520,445 A | 8/1950 | Sponsler | |
| 2,985,261 A | 5/1961 | Kubesh | |
| 2,998,106 A | 8/1961 | Aust | |
| 3,700,877 A * | 10/1972 | Wilson | 362/300 |
| 4,298,911 A * | 11/1981 | Headrick | 362/35 |
| 4,319,311 A * | 3/1982 | Mitchell | 362/249.09 |
| 4,361,872 A | 11/1982 | Spalti | |
| 4,712,167 A | 12/1987 | Gordin et al. | |
| 4,729,077 A | 3/1988 | Gordin et al. | |
| 4,994,718 A | 2/1991 | Gordin | |
| 5,207,747 A | 5/1993 | Gordin et al. | |
| 5,209,560 A | 5/1993 | Taylor et al. | |
| 5,272,611 A * | 12/1993 | Lai | 362/373 |
| 5,313,378 A | 5/1994 | Gordin et al. | |
| 5,373,346 A | 12/1994 | Hocker | |

(Continued)

OTHER PUBLICATIONS

AGi32.com—Lighting Application Software, "What is AGi32?", retrieved from the Internet: http://www.agi32.com/Products/AGI32/agi32.htm on Apr. 6, 2009 (5 pages).

(Continued)

*Primary Examiner* — Kesha Frisby
(74) *Attorney, Agent, or Firm* — McKee, Voorhees & Sease

(57) ABSTRACT

Apparatus, methods, and systems for a novel approach to on-site evaluation and demonstration of illumination schemes to fit the unique needs of a defined area or object. The system provides a versatile method of producing a wide range of illumination schemes from a limited number of components and allows for optional add-on features or replaceable modules to simulate various lighting characteristics from various types of lighting fixtures, including commercially available fixtures or custom fixtures. Methods of wireless control described herein help to achieve the purpose of the mobile lighting evaluation system in that a system operator may evaluate and/or demonstrate illumination schemes from a convenient remote location.

10 Claims, 16 Drawing Sheets

(56) References Cited

U.S. PATENT DOCUMENTS

| | | | |
|---|---|---|---|
| 5,636,024 | A | 6/1997 | Crookham et al. |
| 5,794,387 | A | 8/1998 | Crookham |
| 5,860,733 | A | 1/1999 | Stone et al. |
| 5,906,425 | A | 5/1999 | Gordin et al. |
| 5,936,362 | A * | 8/1999 | Alt et al. .................... 315/312 |
| 5,944,413 | A | 8/1999 | Crookham et al. |
| 6,016,038 | A | 1/2000 | Mueller et al. |
| 6,016,389 | A | 1/2000 | Crookham et al. |
| 6,087,834 | A | 7/2000 | Tury et al. |
| 6,150,774 | A | 11/2000 | Mueller et al. |
| 6,373,255 | B2 | 4/2002 | Tury et al. |
| 6,446,408 | B1 | 9/2002 | Gordin et al. |
| 6,526,360 | B1 | 2/2003 | Ito et al. |
| 6,548,967 | B1 | 4/2003 | Dowling et al. |
| 6,577,962 | B1 | 6/2003 | Afshari |
| 6,681,110 | B1 | 1/2004 | Crookham et al. |
| 6,692,142 | B1 | 2/2004 | Gordin et al. |
| 6,975,079 | B2 | 12/2005 | Lys et al. |
| 7,106,261 | B2 | 9/2006 | Nagel et al. |
| 7,231,060 | B2 | 6/2007 | Dowling et al. |
| 7,246,782 | B2 | 7/2007 | Crookham et al. |
| 7,309,965 | B2 | 12/2007 | Dowling et al. |
| 7,319,298 | B2 | 1/2008 | Jungwirth et al. |
| 7,495,817 | B2 | 2/2009 | Hunt |
| 7,500,764 | B2 | 3/2009 | Gordin |
| 7,502,034 | B2 | 3/2009 | Chemel et al. |
| 7,573,209 | B2 | 8/2009 | Ashdown et al. |
| 7,573,210 | B2 | 8/2009 | Ashdown et al. |
| 7,656,371 | B2 | 2/2010 | Shimizu et al. |
| 7,687,753 | B2 | 3/2010 | Ashdown |
| 7,778,635 | B2 | 8/2010 | Crookham et al. |
| 7,845,824 | B2 | 12/2010 | Robotham |
| 7,956,551 | B1 | 6/2011 | Gordin |
| 7,976,199 | B2 | 7/2011 | Berns et al. |
| 7,982,404 | B2 | 7/2011 | Gordin |
| 8,098,024 | B1 | 1/2012 | Gordin |
| 8,174,408 | B2 | 5/2012 | Johnston et al. |
| 8,183,785 | B2 | 5/2012 | Boleko Ribas et al. |
| 2003/0210555 | A1 | 11/2003 | Cicero et al. |
| 2004/0105264 | A1 | 6/2004 | Spero |
| 2005/0138106 | A1 | 6/2005 | Crookham et al. |
| 2005/0138142 | A1 | 6/2005 | Crookham et al. |
| 2006/0076908 | A1 | 4/2006 | Morgan et al. |
| 2007/0043540 | A1 | 2/2007 | Cleland et al. |
| 2008/0158115 | A1 | 7/2008 | Cordes et al. |
| 2008/0183081 | A1 | 7/2008 | Lys et al. |
| 2009/0085500 | A1 | 4/2009 | Zampini, II et al. |
| 2009/0323330 | A1 | 12/2009 | Gordin et al. |
| 2010/0096993 | A1 | 4/2010 | Ashdown et al. |
| 2010/0309298 | A1 | 12/2010 | Muijs et al. |
| 2011/0245939 | A1 | 10/2011 | Crookham et al. |
| 2012/0040606 | A1 * | 2/2012 | Verfuerth .......................... 455/7 |
| 2012/0050254 | A1 | 3/2012 | Gordin et al. |

OTHER PUBLICATIONS

Autodesk Design Visualization for Architects, "Try more, test more, tell more." 2007 (7 pages).

Anvil Cases: Products, "XLT Series Cases are Heavy-Weights . . . Minus the Heavy Part", retrieved from the Internet: http://www.anvilcase.com/products/xltl.html on Apr. 6, 2009 (2 pages).

Wikipedia: Potentiometer, retrieved from the Internet: http://enwikipedia.org/wiki/Potentiometer on Apr. 7, 2009 (6 pages).

Genie—Material Lifts: Super Hoist, GH 3.5K 0108G. Part No. 109310, www.genieindustries.com, Terex Corporation 2008 (1 page).

Honda Power Equipment—EB6500, retrieved from the Internet: http://www.hondapowerequipment.com on Apr. 8, 2009 (2 pages).

Featherlite Trailers—Commercial and Utility Trailers—1611 Utility Trailer, retrieved from the Internet: http://www.fthr.com/dry-freight_commercial-utility-trailer/model1611 on Apr. 8, 2009 (5 pages).

Wikipedia: Color gel, retrieved from the Internet: http://en.wikipedia.org/wiki/Color_gel on Apr. 9, 2009 (3 pages).

Luminit—Shaping Light as Needed, "Architectural/Event Lighting Diffusers", www.luminitco.com, Torrance, California, date unknown (2 pages).

Acopian Power Supplies, Low Profile Switching Regulated (to 720 watts), www.acopian.com, Easton, Pennsylvania, date unknown (8 pages).

* cited by examiner

LED X 84 (7 X 12 ARRAY)

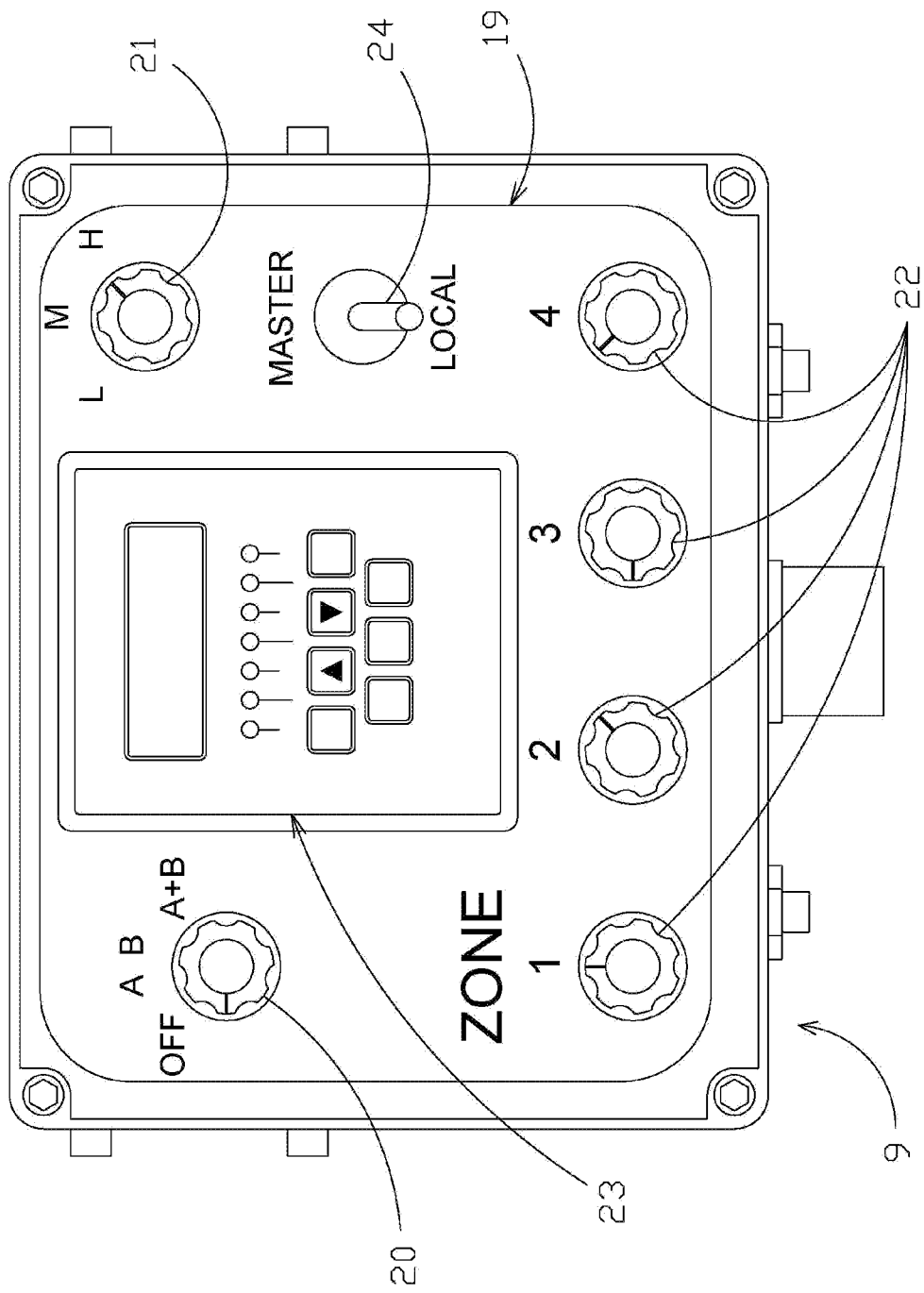

APPARATUS, METHOD, AND SYSTEM FOR ON-SITE EVALUATION OF ILLUMINATION SCHEME USING A MOBILE LIGHTING EVALUATION SYSTEM

CROSS-REFERENCE TO RELATED APPLICATIONS

This application claims priority under 35 U.S.C. §119 to provisional U.S. application Ser. No. 61/173,486, filed Apr. 28, 2009, hereby incorporated by reference in its entirety.

I. BACKGROUND OF INVENTION

Field of Invention

The present invention relates to illumination for various lighting applications including but not limited to architectural, security, parking, general area, interior, larger area and others. More specifically, the field of the invention relates to creating a plurality of illumination schemes using solid-state light sources and wireless control methods, but is not limited to such.

In the current state of the art, field testing of lighting equipment is sometimes performed by a manufacturer or lighting designer. The lighting manufacturer may use information from field testing to improve the fixture performance or create data sheets for the lighting designer(s) to use with, for example, computer-based light modeling (e.g., AGi32 modeling software available from Lighting Analysts, Inc., Littleton, Colo., U.S.). The lighting designer(s), in turn, may perform separate or independent testing of a lighting fixture to verify the performance standards published by the manufacturer. In some instances where testing or computer modeling does not yield satisfactory results, a preliminary lighting system may be built to determine if the selected components adequately address the needs of the area or object(s) to be illuminated. However, this approach is limited to the selected fixtures used in the preliminary system and does not provide for easy or simple field modifications to evaluate other possible solutions. If a modified illumination scheme is needed, the fixtures for the new scheme may need to be purchased or specially ordered and may cause delays, additional expense, and additional setup time; or possibly require a completely new preliminary lighting system. This cycle may be repeated for an application for multiple illumination schemes until the desired results are achieved.

As previously stated, a computer-based lighting model of an illumination scheme is often created by the lighting designer. However, since the generated lighting model is typically based on inputs from a variety of sources, it is subject to error. For example, if the lighting performance information is inaccurate, if the site topography is different than anticipated, or if some other disparate condition exists then the model may not accurately represent the light distribution of the final installed system. Further, some unique site conditions or special needs of the lighting system may be difficult for the modeling software to create or represent. Even if it is within the design capabilities of the software, the amount of time required by the designer to define or replicate the site condition may be impractical for the projects needs. Still further, the presentation or output documentation of the lighting model may be difficult for a customer to understand or completely visualize, even when presented as a photo rendering model or 3-D graphics.

For example, a customer may be undecided on the best illumination scheme for an application. While a lighting model may assist in making some decisions, an on-site evaluation of the lighting system may be needed. However, an on-site representation of the proposed lighting system may be difficult to enable without considerable planning, equipment setup, and preliminary testing of the system prior to customer viewing. In addition, demonstrating to the customer options between various proposed illumination schemes may be difficult without considerable downtime while fixtures are replaced with different components (e.g., light sources). As a result, the customer may lose confidence in the designer or manufacturer's ability to deliver the desired lighting system that will meet their expectations.

As another example, a customer may not be knowledgeable about advances in lighting technology and may benefit from an on-site evaluation of the performance of fixture(s) using different technologies (e.g., reflectors, diffusers). Again, a limitation of on-site evaluation of illumination schemes in the current state of the art is the required setup time to adapt a fixture, or plurality of fixtures, for a temporary installation.

As another example, an on-site presentation and evaluation of a proposed illumination scheme may be required as part of a contract. In the current state of the art, such an on-site demonstration may be difficult and expensive to install for a temporary period. In addition, the lighting equipment needed for the presentation may need to be specially purchased. If the customer requests changes to the system based on the presentation, then additional lighting equipment may need to be purchased and the presentation repeated. This may result in extra expense and frustration for the designer and/or customer.

As another example, fixtures that are commercially available may be preset or designed for a particular use or application and may not adapt well to field modifications to effect alternative illumination schemes. The designer may be limited to the tools or equipment available at the site to modify the lighting equipment for the unique needs of the site. As such, an existing concern for the designer and customer is whether or not the modifications performed in the field may be replicated at the manufacturer for a permanent installation. Thus, there is room for improvement in the art.

II. SUMMARY OF INVENTION

The apparatus, methods, and systems described herein provide for a novel approach to on-site evaluation and demonstration of illumination schemes to fit the unique needs of a defined application, area, or object. Aspects according to the present invention provide for a wide range of illumination schemes from a limited number of components, and allow for optional add-on features or replaceable modules to simulate various lighting characteristics from various types of lighting fixtures, resulting in a versatile lighting system. Wireless control of the lighting system may further the versatility of the system and add to the ease with which the lighting system may produce illumination schemes to fit the unique needs of a defined application, area, or object.

It is therefore a principle object, feature, advantage, or aspect of the present invention to improve over the state of the art and/or to solve problems and deficiencies in the state of the art.

Further objects, features, advantages, or aspects of the present invention may include one or more of:
   a. means and/or methods for providing on-site evaluation of a lighting scheme, b. means and/or methods for producing from a relatively small number of components a variety of lighting characteristics which may include any of, but is not limited to, the following:
  i. illumination level,
  ii. color (where color is characterized in terms of color temperature),
  iii. beam shape and/or distribution, and
  iv. modeling of illuminated objects;
c. means and/or methods for centralizing control of the components such that:
  i. control of the lighting system may be facilitated from at least one of the components of the lighting system, and/or
  ii. control of the lighting system may be facilitated from a geographically remote location;
d. means and/or methods for providing user feedback of operating parameters which may include any of, but is not limited to, the following:
  i. active light source(s),
  ii. power consumption,
  iii. rated wattage, and
  iv. relative operating power level; and
e. means and/or methods for providing portability of the lighting system.

These and other objects, features, advantages, or aspects of the present invention will become more apparent with reference to the accompanying specification.

III. BRIEF DESCRIPTION OF THE DRAWINGS

From time-to-time in this description reference will be taken to the drawings, which are identified by figure number and are summarized below.

FIG. 2A illustrates an assembled fixture whereas FIG. 2B illustrates the fixture of FIG. 2A with inserts and/or lenses removed such that an array of light sources may be illustrated.

Figure 1:
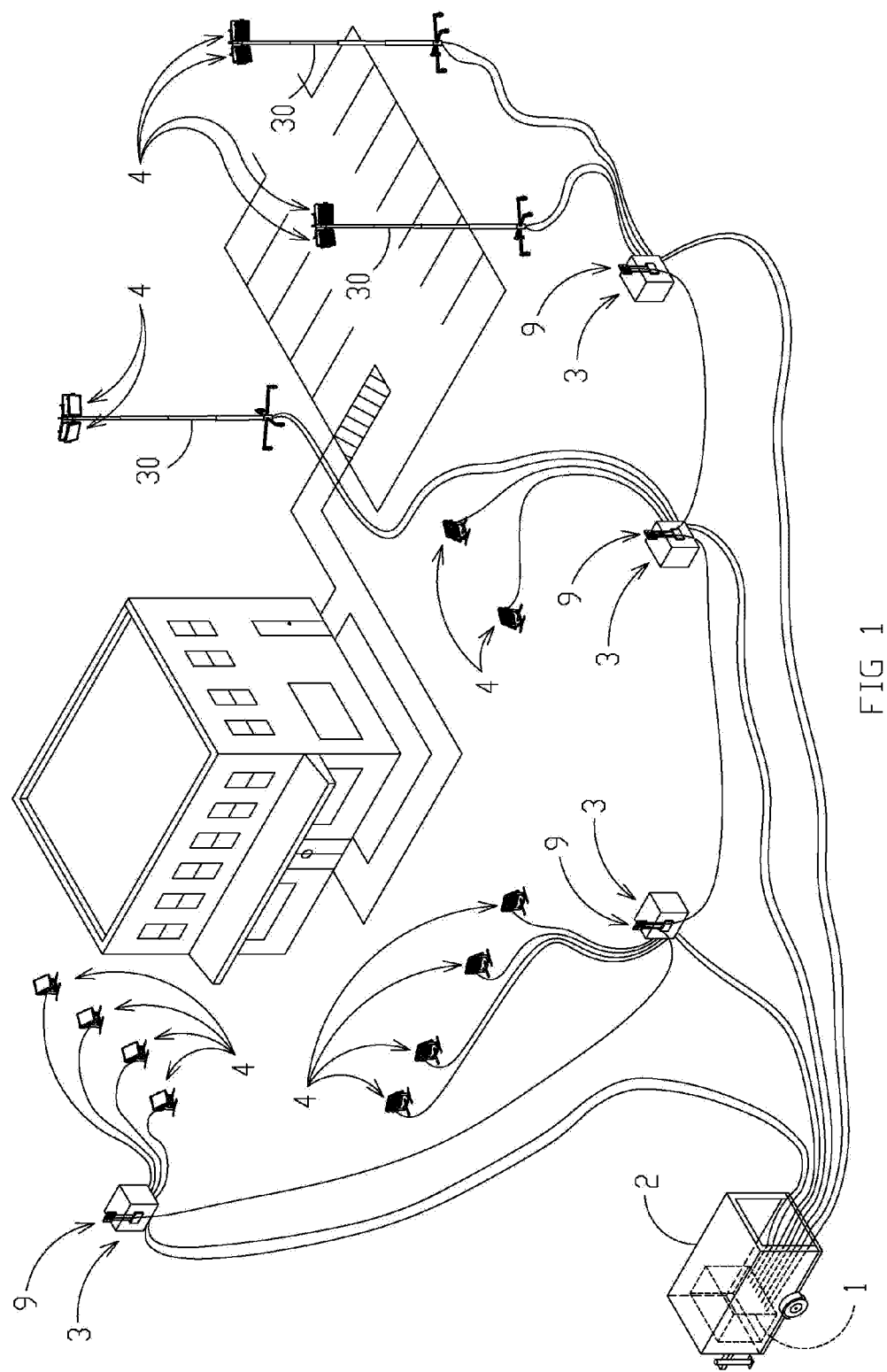
FIG. 1 illustrates a perspective view diagram of an overview of a mobile lighting evaluation system according to one or more exemplary embodiments.
Figure 2A:
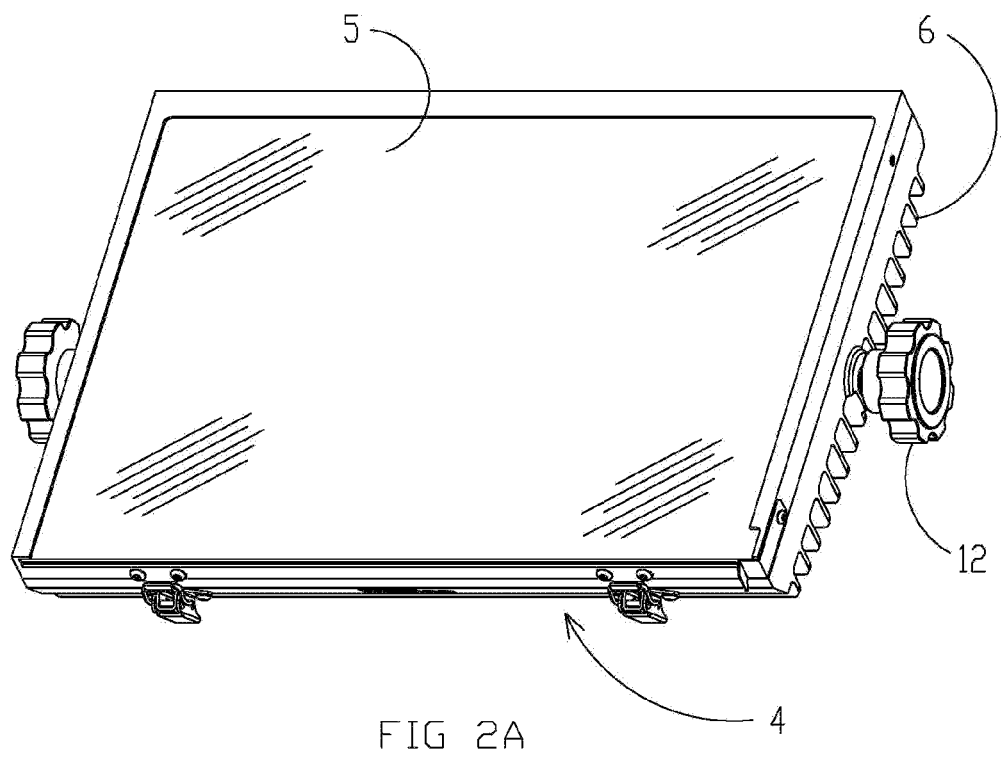
FIGS. 2A and 2B illustrate enlarged perspective views of one possible lighting fixture used in the mobile lighting evaluation system illustrated in FIG. 1.
Figure 2B:
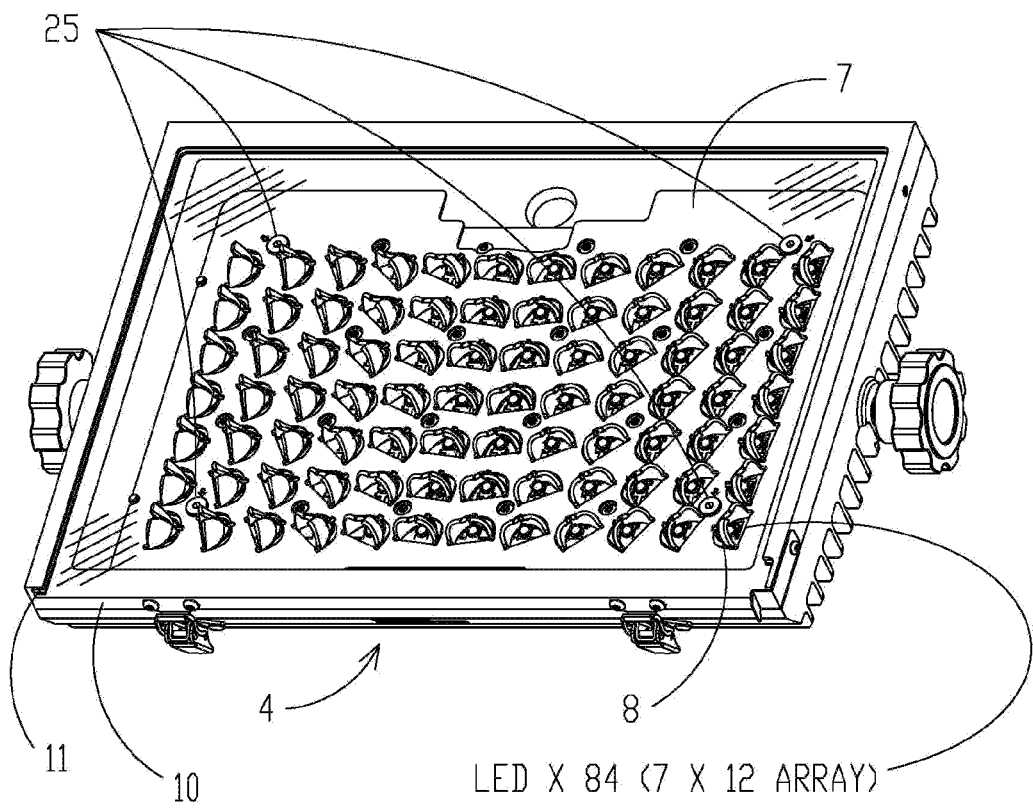
Figure 3A:
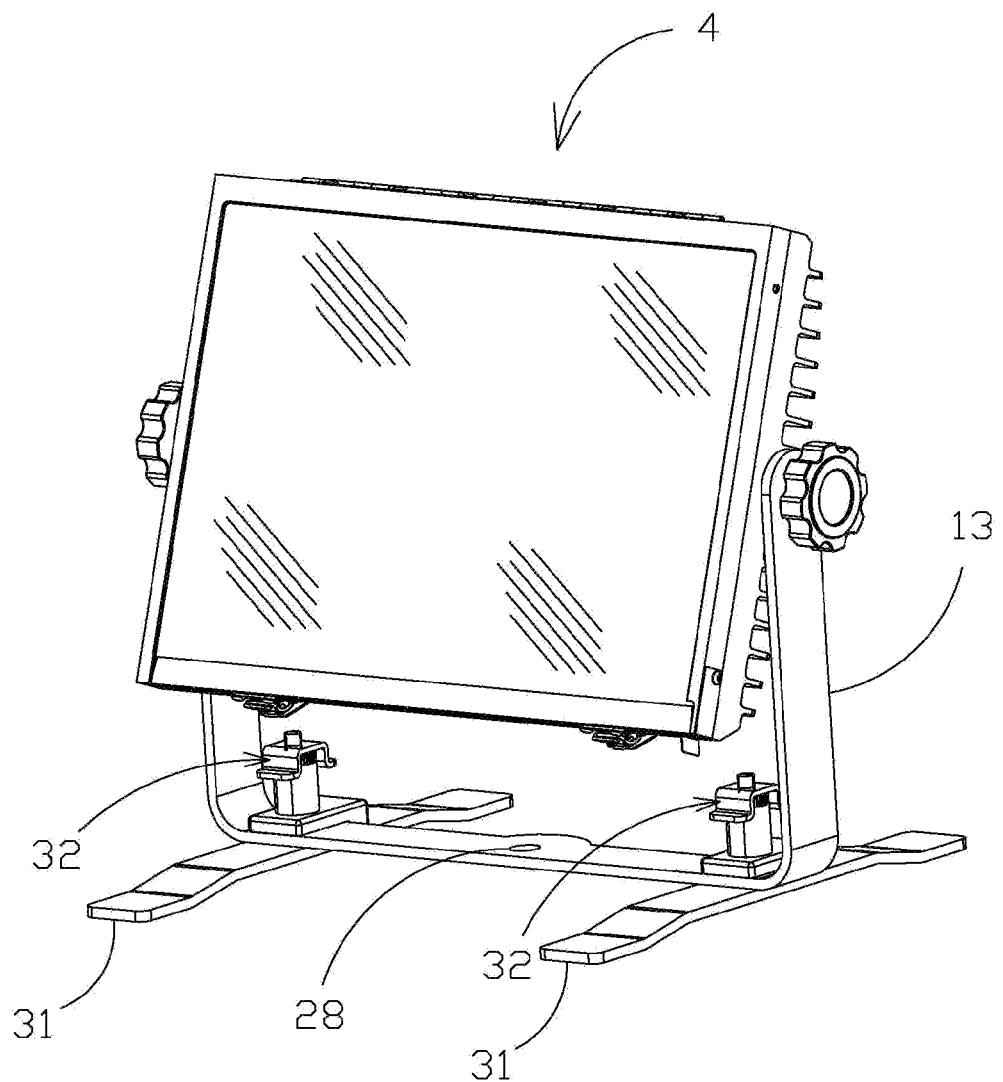
Figure 3B:
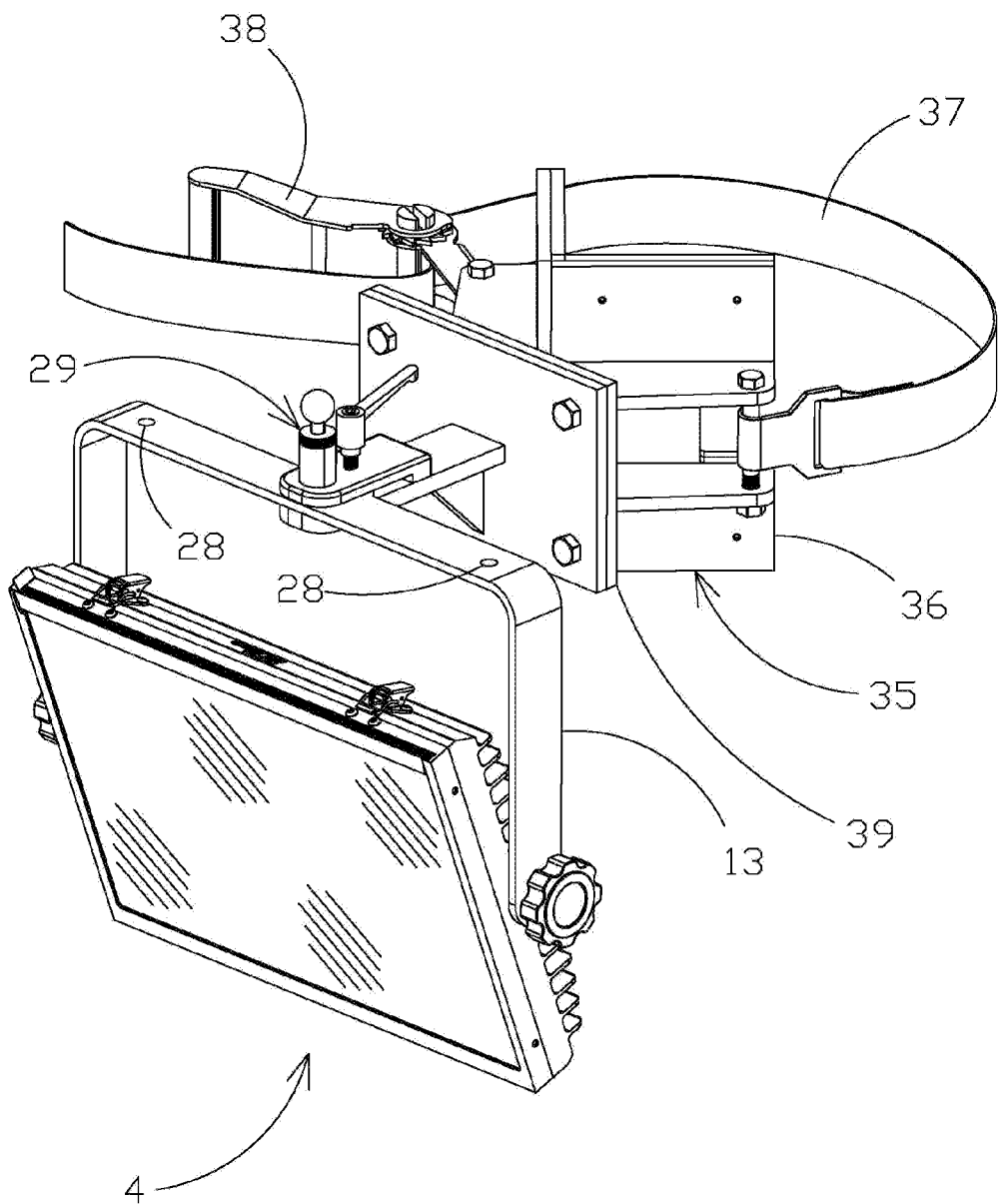
Figure 3C:
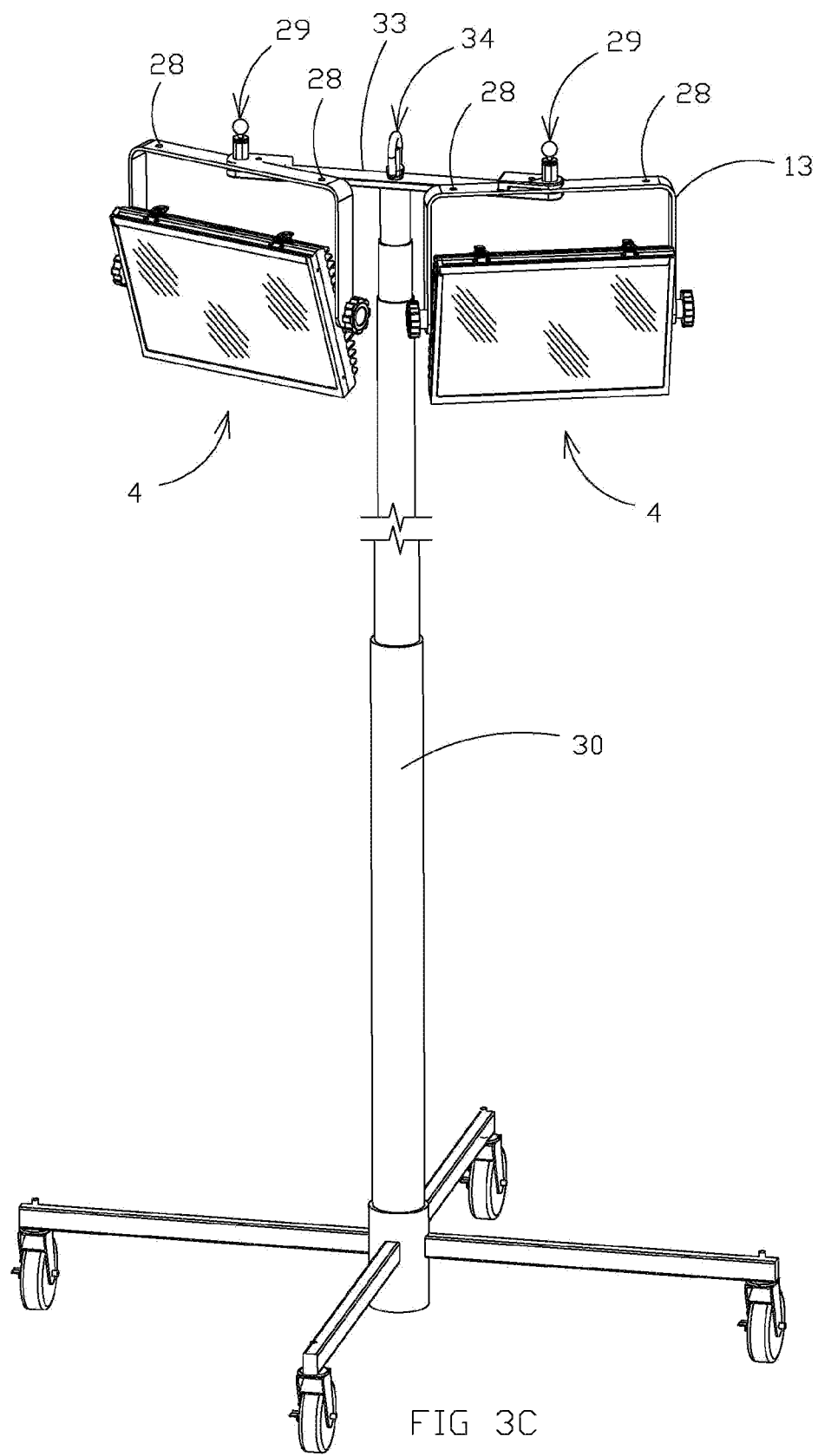

FIGS. 3A-C illustrate perspective views of various fixture mounts for use with, for example, the fixture of FIGS. 2A and 2B and/or in the mobile lighting evaluation system illustrated in FIG. 1.

Figure 4A:
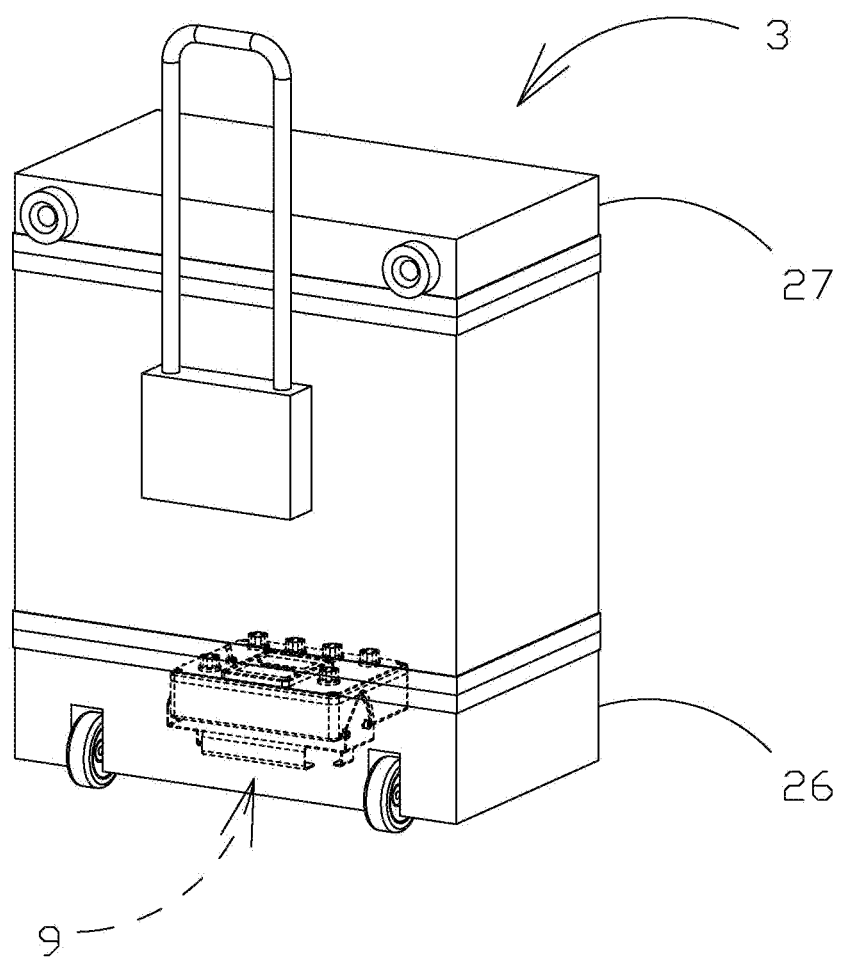
Figure 4B:
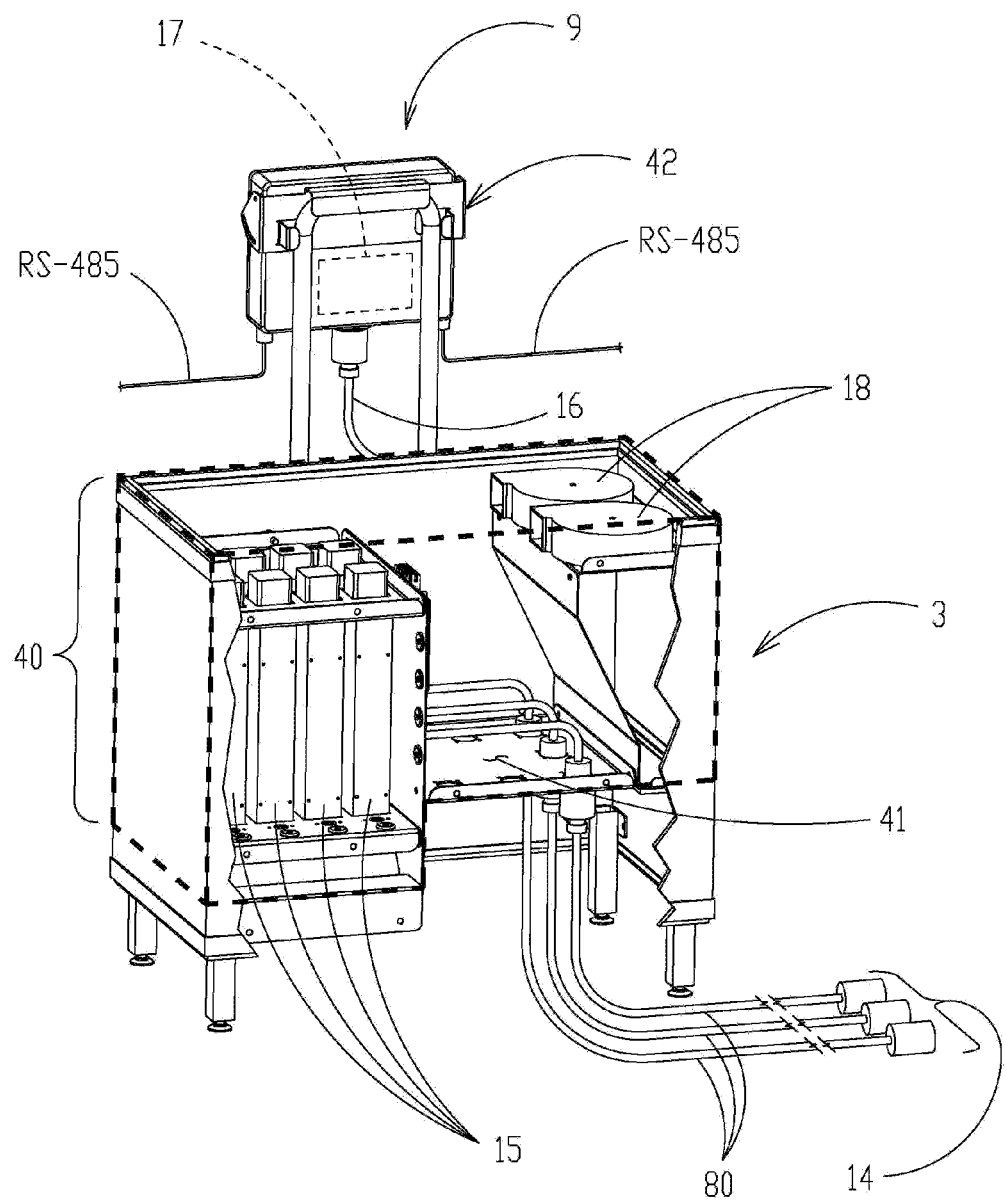

FIGS. 4A and 4B illustrate perspective views of a power cabinet and control panel in mounted position for use in the mobile lighting evaluation system illustrated in FIG. 1. FIG. 4A illustrates one possible method of housing the control panel when not in use whereas FIG. 4B illustrates, by way of portions of the power cabinet removed, various components associated with the power cabinet and control panel.

Figure 5A:
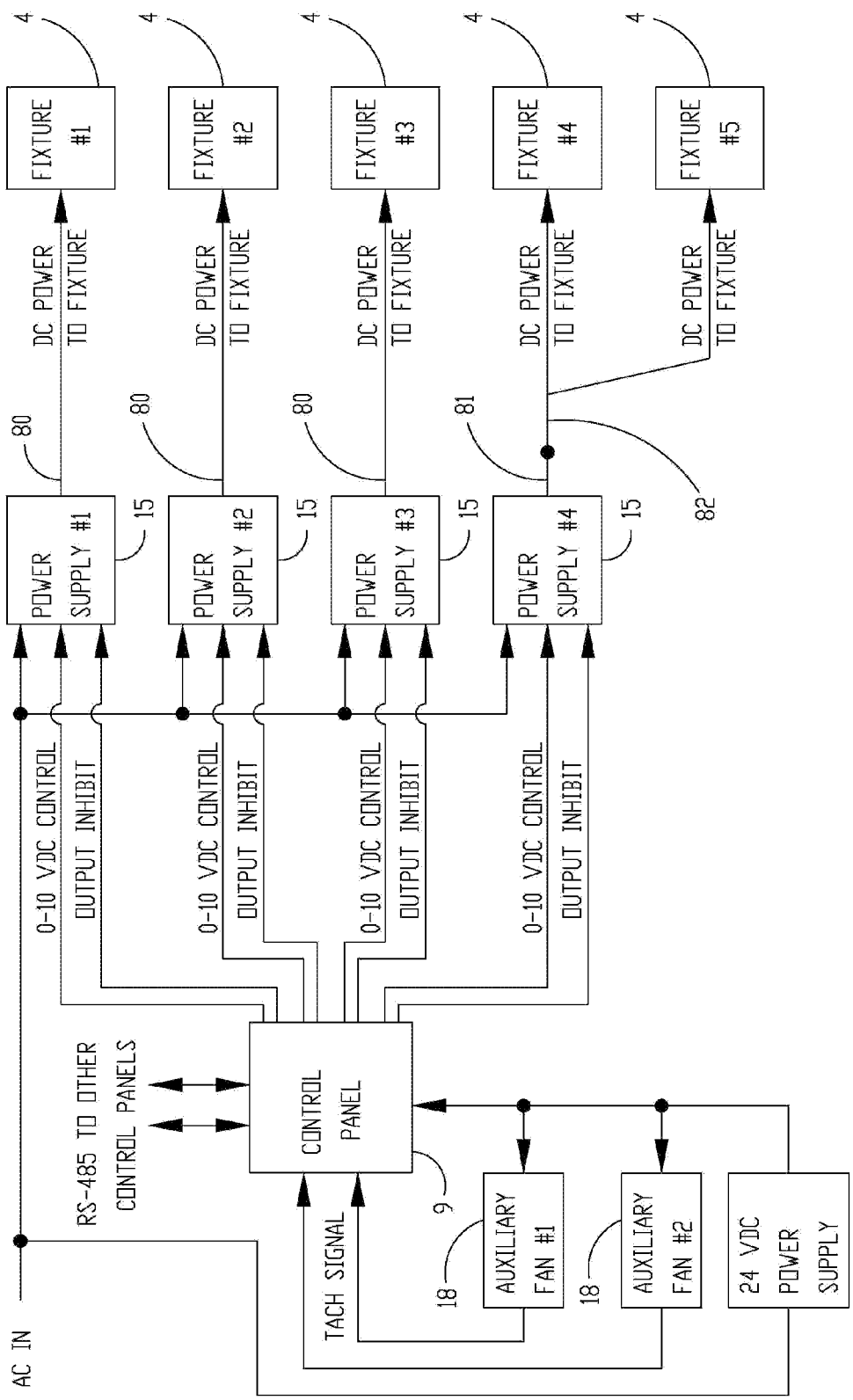
Figure 5B:
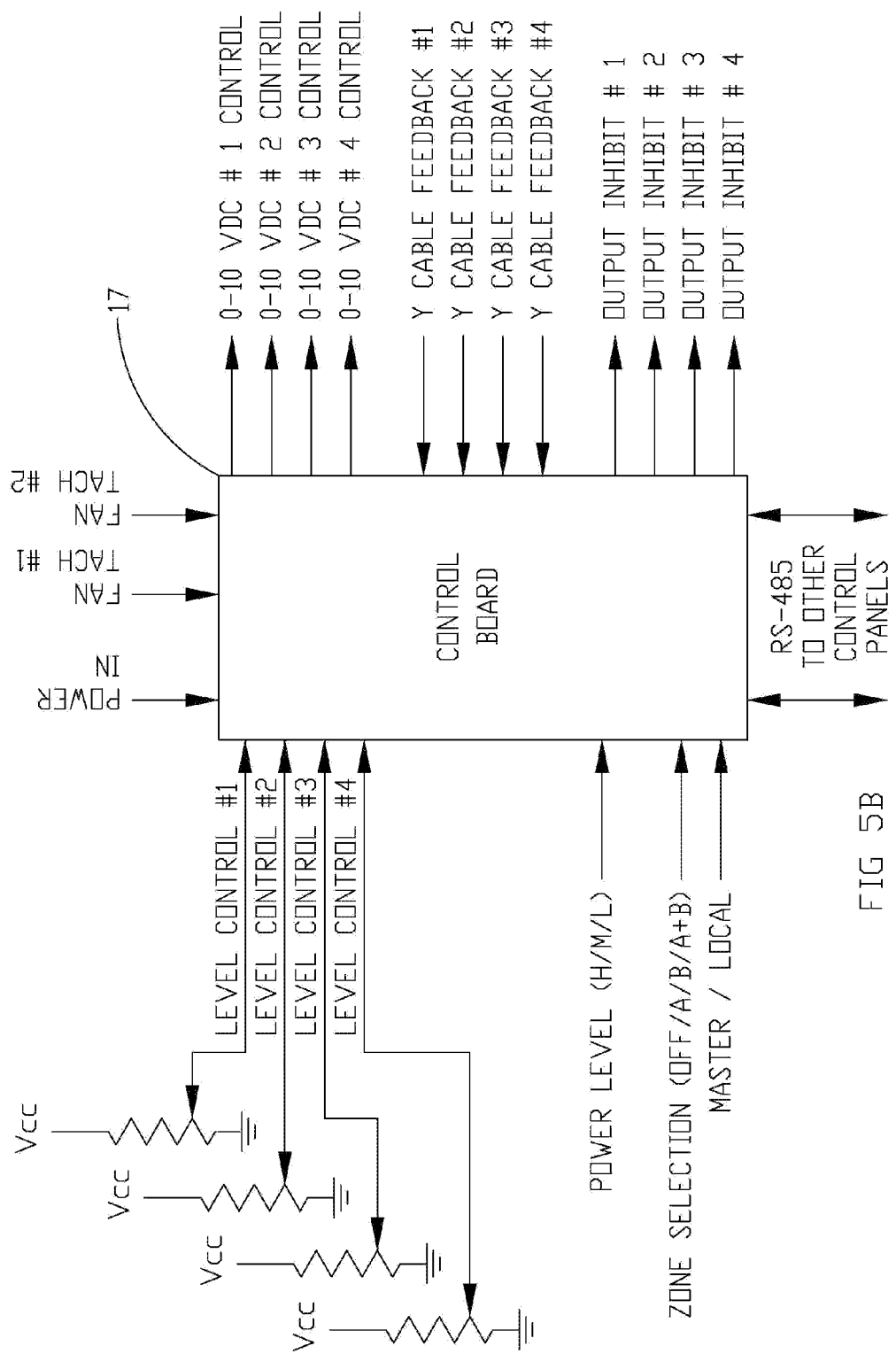

FIGS. 5A and 5B diagrammatically illustrate the interaction between components of the power cabinet and control panel illustrated in FIGS. 4A and 4B, and fixtures illustrated in FIGS. 2A and 2B.

FIG. 6 illustrates an enlarged front elevation view of one possible user interface of the control panel illustrated in FIGS. 4A and 4B.

Figure 7A:
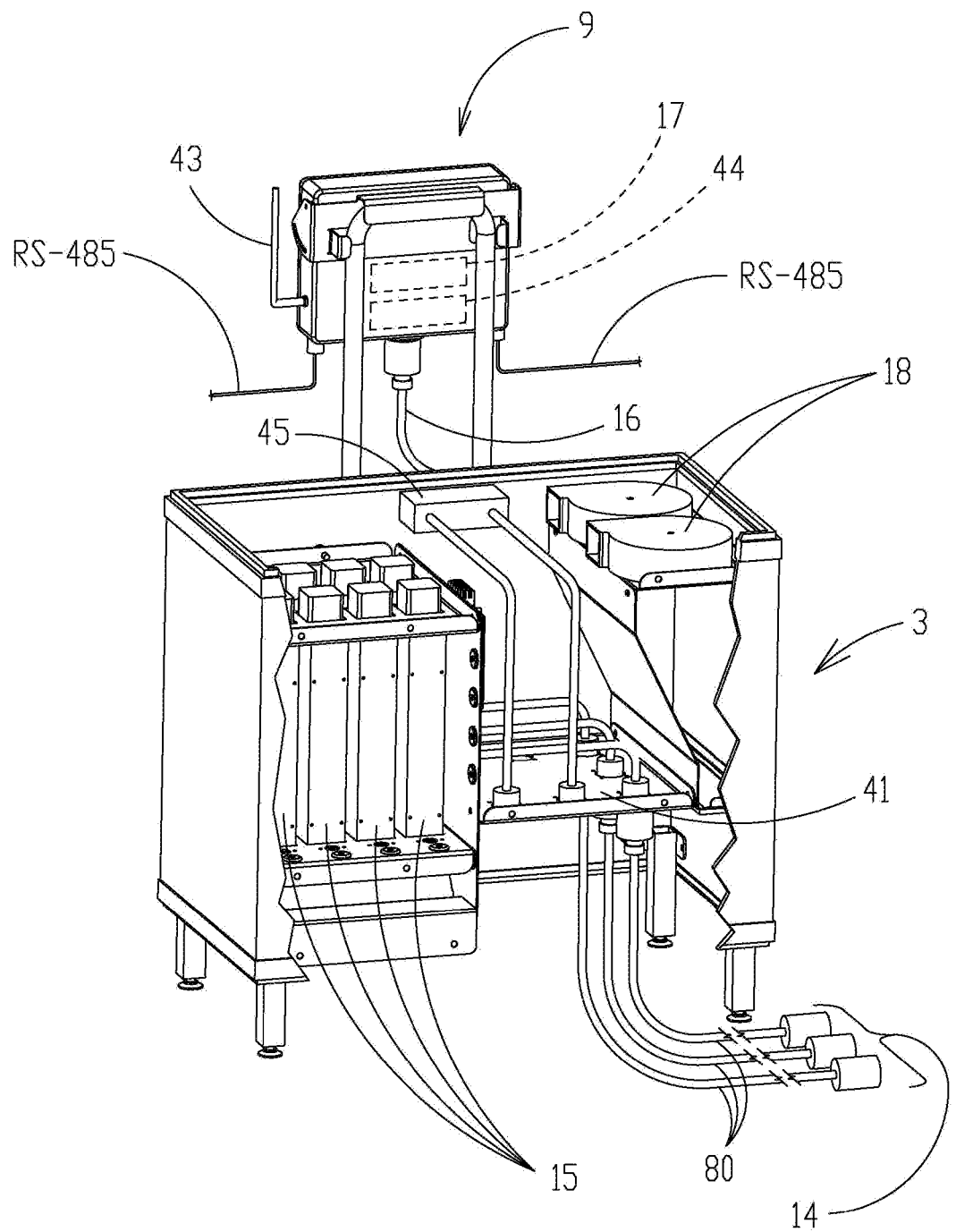
Figure 7B:
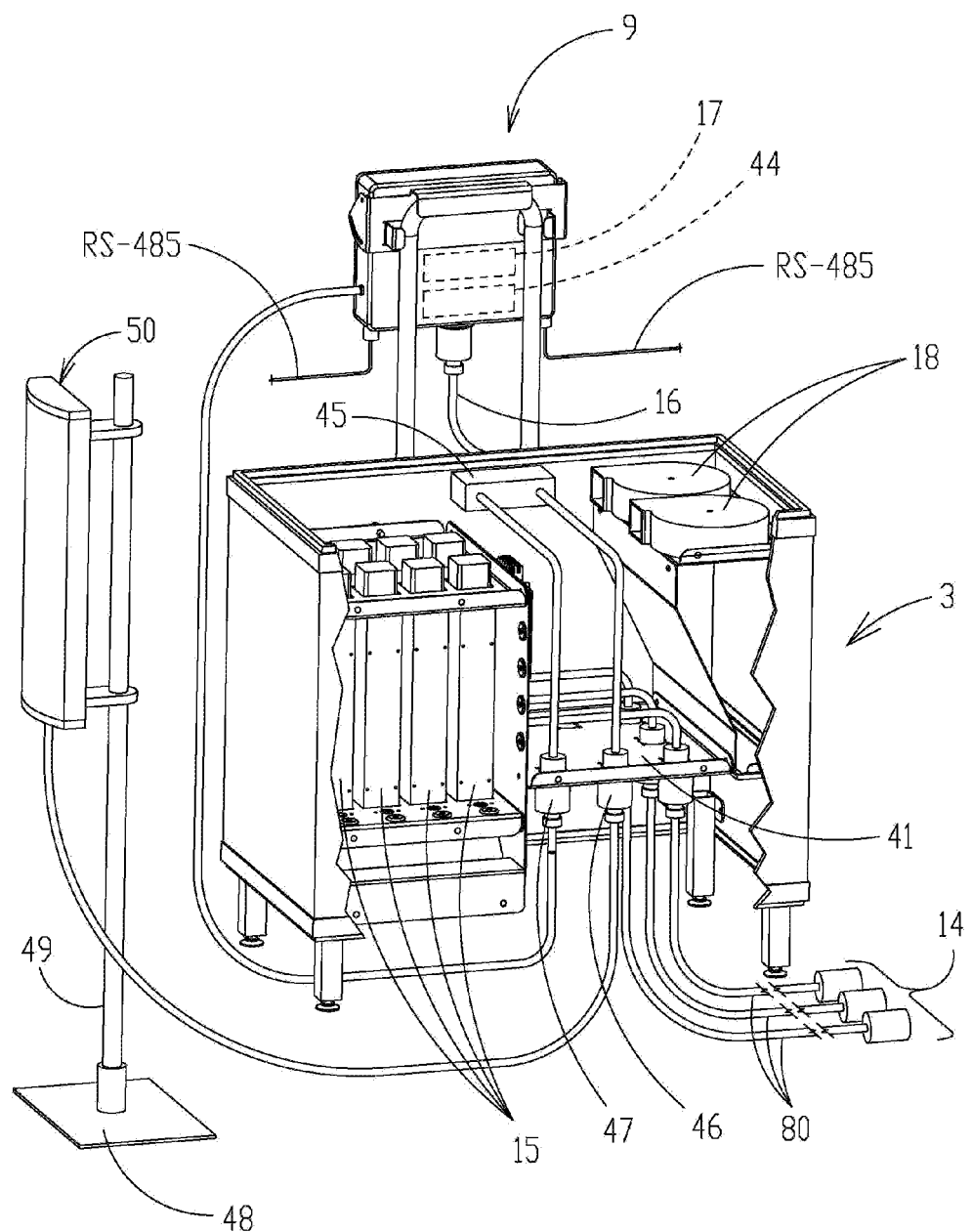

FIGS. 7A and 7B illustrate perspective views of components of a mobile lighting evaluation system according to an alternative exemplary embodiment. FIG. 7A illustrates the system in short range mode whereas FIG. 7B illustrates the system in long range mode.

Figure 8A:
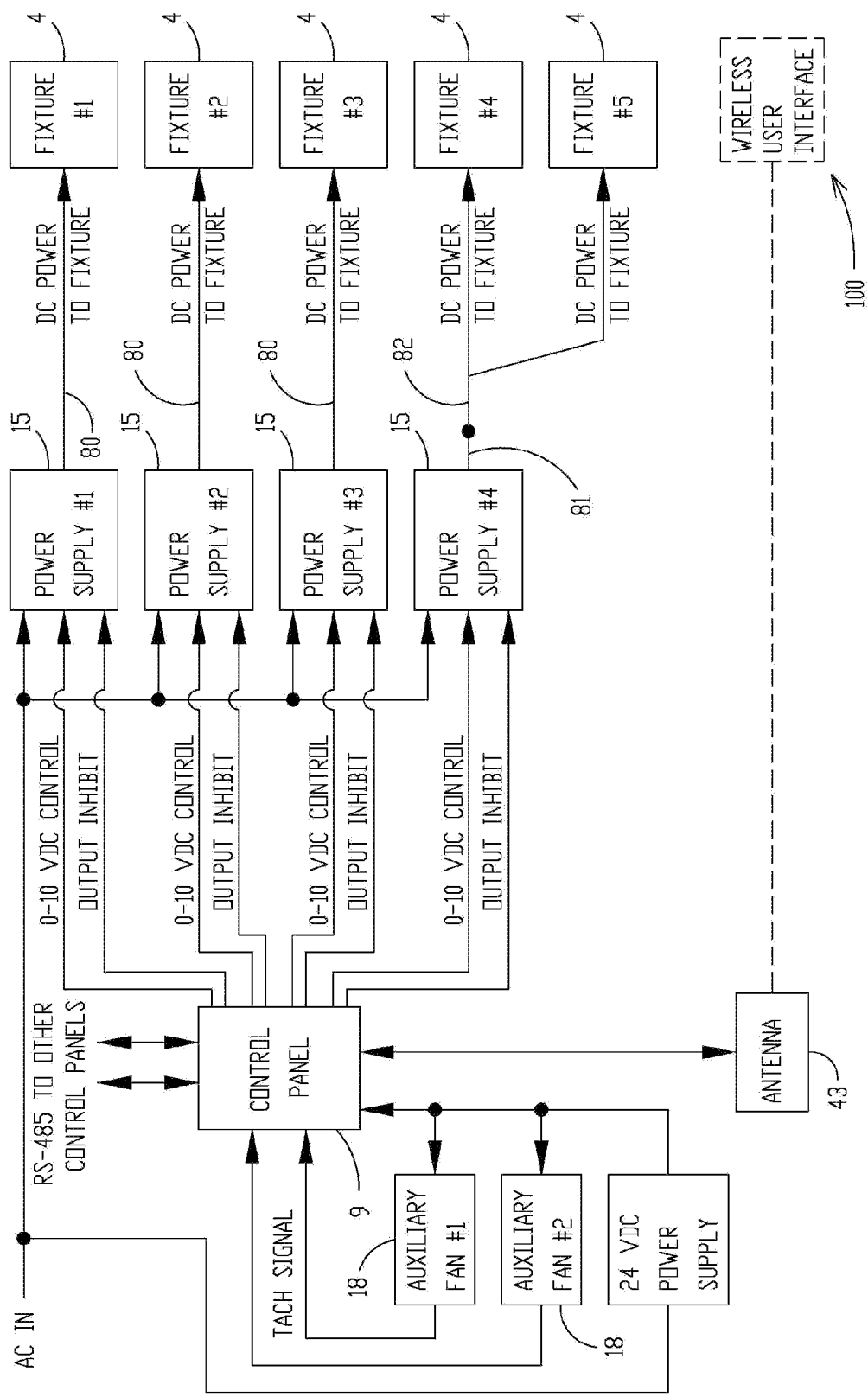
Figure 8B:
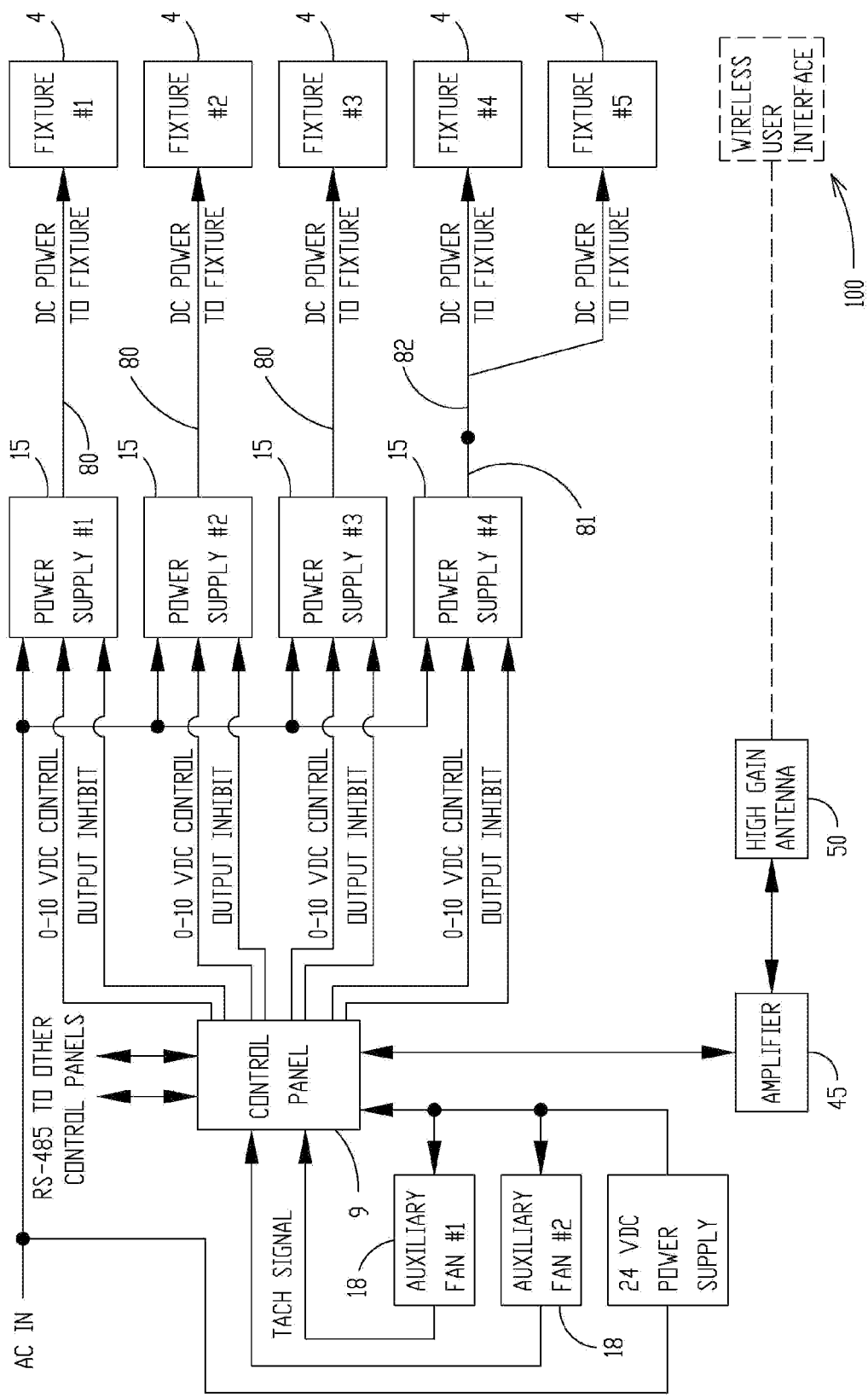

FIGS. 8A and 8B diagrammatically illustrate the interaction between components of the power cabinet and control panel illustrated in FIGS. 7A-B, fixtures illustrated in FIGS. 2A and 2B, and wireless networking components according to the alternative exemplary embodiment.

Figure 9:
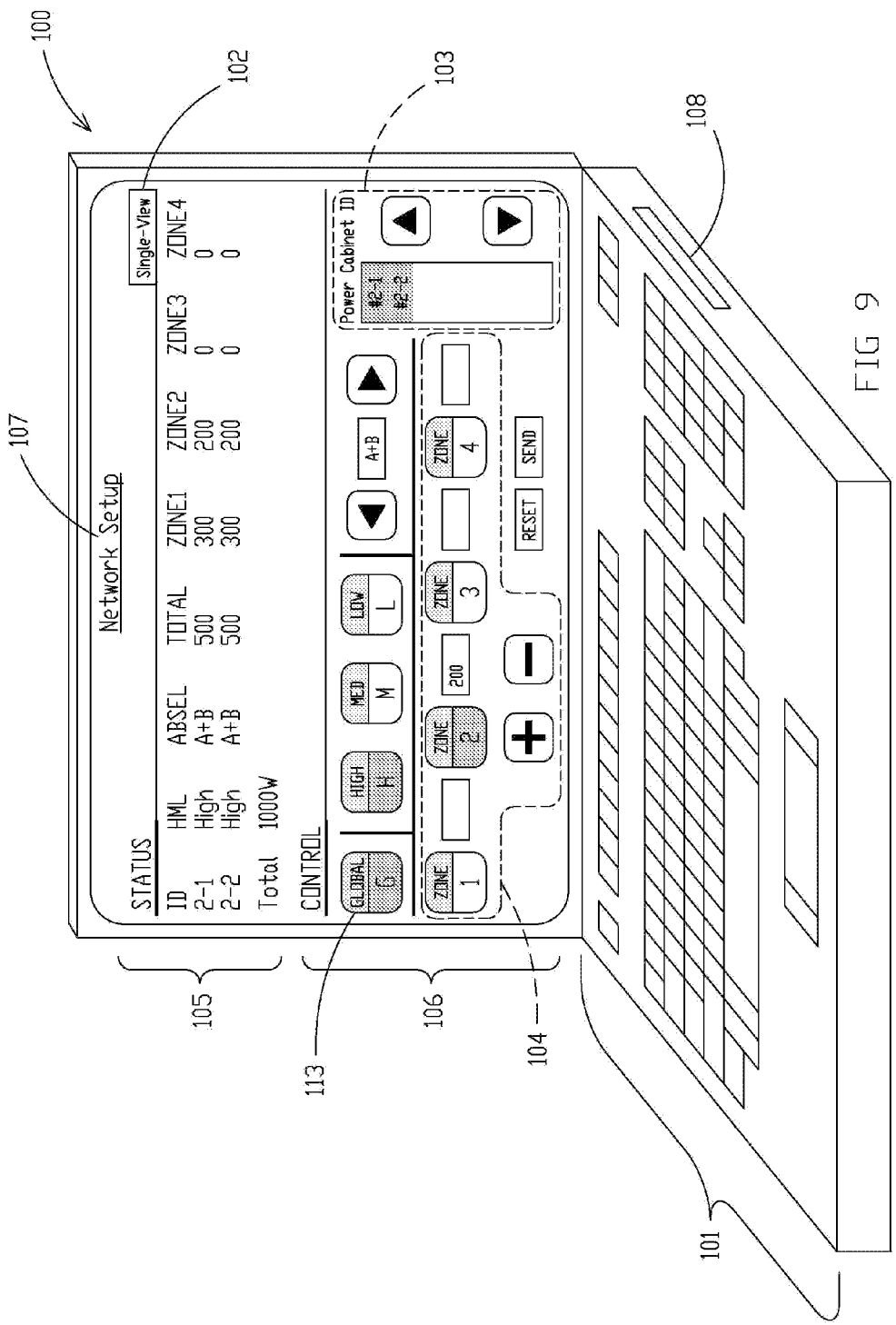

FIG. 9 illustrates an enlarged perspective view of one possible wireless controller user interface according to the alternative exemplary embodiment.

Figure 10:
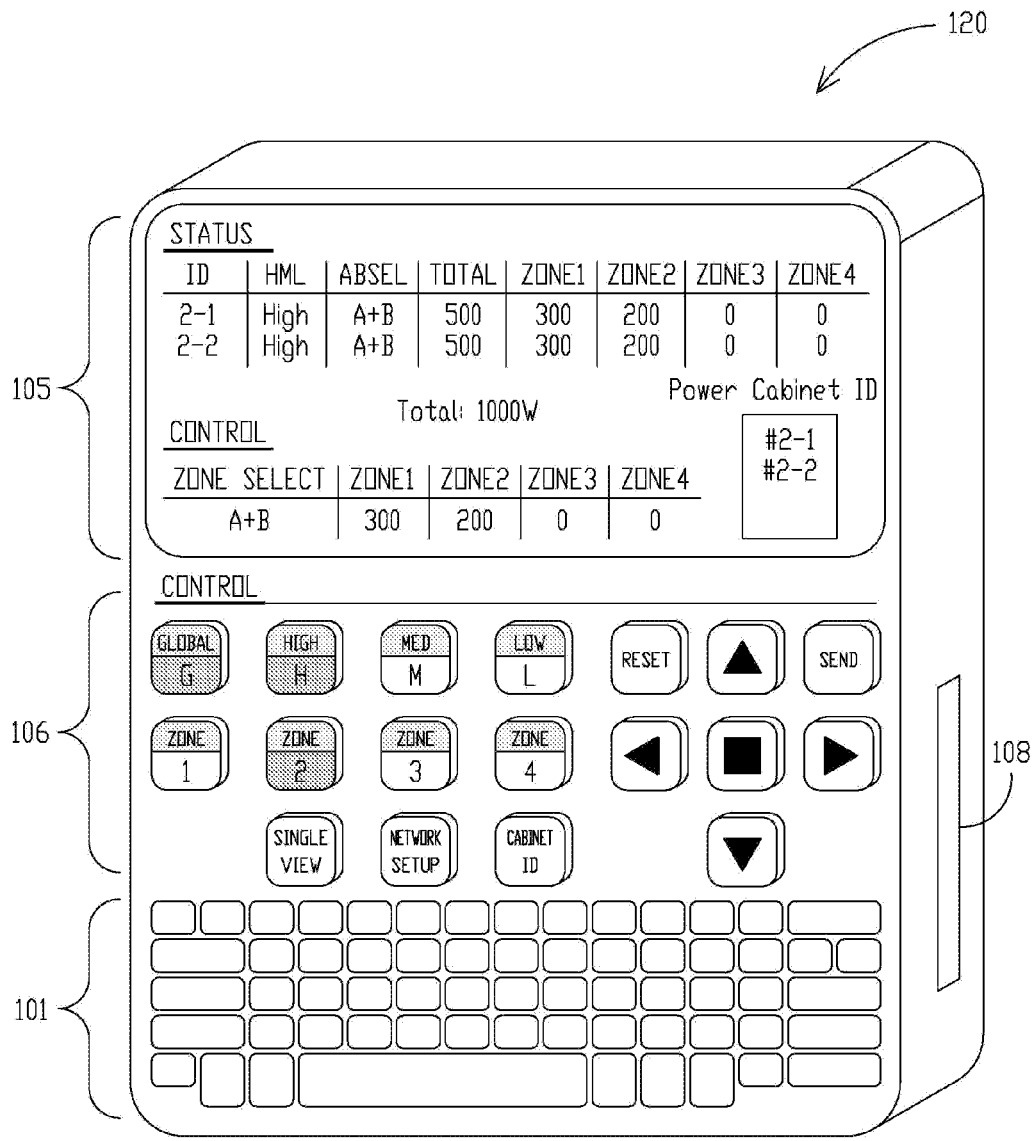

FIG. 10 illustrates an enlarged perspective view of an alternative wireless controller user interface according to the alternative exemplary embodiment.

IV. DETAILED DESCRIPTION OF EXEMPLARY EMBODIMENTS

A. Overview

To further the understanding of the present invention, specific exemplary embodiments according to the present invention will be described in detail. Frequent mention will be made in this description to the drawings. Reference numbers, letters, or captions will be used to indicate certain parts or locations in the drawings. The same reference numbers, letters, or captions will be used to indicate the same parts or locations throughout the drawings.

Aspects according to the present invention envision methods of producing a wide range of illumination schemes using a limited number of physical components designed to be both mobile and weather-hardy. Various aspects of solid-state lighting technology may be demonstrated in a wide range of venues for purposes of marketing, diagnostics, education, or otherwise. It is of note, however, that the exemplary embodiments, options, and alternatives described herein are by way of example and not by way of limitation.

As has been stated, there are a variety of methods currently available to evaluate a particular illumination scheme; field testing and computer modeling are two such methods. While such methods may produce quantifiable results (e.g., light uniformity) that are readily understood by a lighting engineer or designer, quantifiable results rarely provide a customer with an understanding of the aesthetics of an illumination scheme (e.g., perceived softness of light). Thus, it is sometimes beneficial to visually demonstrate how quantifiable inputs (e.g., power level, color properties, beam shape, etc.) affect a customer's impression of an illumination scheme. Even customers with significant knowledge of lighting properties may benefit from a visual demonstration of how various inputs may affect the overall illumination scheme for a particular application, even if the demonstration is not to the full scale of the installed lighting system. For example, a customer may be able to readily visualize what a given illumination scheme looks like when illuminating an interior stairwell, but the customer may not be able the visualize what that same illumination scheme looks like when illuminating an exterior brick wall.

The mobile lighting evaluation system according to at least one aspect of the present invention may provide many potential benefits in addition to the aforementioned: allowing potential purchasers/users to see differences between various lighting schemes, allowing specifications for a lighting system to be more accurately determined, allowing potential purchasers/users to appreciate the benefits of solid-state (or other types) lighting, allowing potential purchasers/users to develop an understanding of how inputs such as intensity level, color properties, and/or beam shape affect a lighting scheme; it may be used in applications where field testing or computer modeling may be too time-consuming or cost-prohibitive, and/or it may be used as a diagnostic tool to determine how existing lighting may be modified to achieve a desired result.

B. Exemplary Method and Apparatus Embodiment 1

Described herein is a mobile lighting evaluation system which provides for evaluation of lighting schemes for purposes including, but not limited to: confirming the accuracy of a computer-based lighting model, evaluating unique site conditions, gathering feedback from a customer or user on desired results, and comparing various fixture types and lighting characteristics.

As envisioned, the mobile lighting evaluation system may be efficiently transported to a site, the components therein installed in desired positions, and lighting characteristics demonstrated. When an appropriate lighting scheme is produced, various data may be collected such that a more permanent lighting system may be developed. Such data may include, but is not limited to:
   a. illumination levels at various points at the site,
   b. quantity and type of fixtures,
   c. wattage and power consumption of fixtures,
   d. fixture locations, height, and/or vertical and horizontal orientation,
   e. beam distribution properties of each fixture,
   f. color properties of each fixture, and
   g. landscaping, available power sources, available locations for fixtures and/or building features at the site.

Such data may be used to assist in producing a more permanent lighting system. The photometric properties of a fixture may be compared to obtained data to assist with selecting a close match; likewise with color properties and beam distribution properties. Additionally, obtained data may be analyzed to account for losses or other discrepancies in the mobile lighting evaluation system that may not be transferred to or normally occur in a permanent system. For example, when diffuser panels are used (as is discussed in greater detail later), the transmission efficiency of the diffuser panels should be considered. The diffuser sheet material described herein indicates a transmission efficiency of 85-92%, or efficiency loss of up to 15%. To account for this loss in light efficiency, fixtures designed or selected for a permanent system may be operated at a lower power level than that recorded for the mobile lighting evaluation system. Compensation for other factors or characteristics may also be achieved in a likewise fashion.

As envisioned, in the present embodiment the mobile lighting evaluation system comprises a plurality of relating components to support mobility, lighting, electrical, and structural aspects and features of the system. Functionality of relating components may generally be characterized by the following.
   a. Mobility components may comprise any apparatus and methods whereby portability of the mobile lighting evaluation system is enhanced (e.g., transport vehicle, cabinets to house components, etc.).
   b. Lighting components may comprise lighting fixtures of a modular design which allow selection of:
      i. optics to vary the beam distribution and/or size,
      ii. gels to control color temperature, and/or
      iii. diffusers to further control beam distribution.
   c. Electrical components may comprise:
      i. electrical power generator(s),
      ii. lighting fixture power supplies,
      iii. components for controlling power of the mobile lighting evaluation system, and
      iv. connective devices associated with the mobile lighting evaluation system.
   d. Structural components may comprise:
      i. support structures for lighting and electrical components, and
      ii. positioning devices for lighting and electrical components.

Operation and functionality of the mobile lighting evaluation system is presently discussed with respect to relating components.

1. Mobility Components—Apparatus, Methods, and Systems

As envisioned, the mobile lighting evaluation system may be housed in some form of transport vehicle or carrier capable of transporting the system to a project site.

FIG. 1 illustrates a trailer 2 which may be pulled by an automotive vehicle (not shown), though this is by way of example and not by way of limitation. For example, trailer 2 may be replaced with an enclosed truck or crate provided said transport vehicle or carrier has sufficient space to house components of the mobile lighting evaluation system, which in this embodiment generally comprises:
   a. cabinets or cases of approximate size 26"×23"×23" (e.g., model XLT-1 available from Anvil Cases, City of Industry, Calif., U.S.) comprising:
      i. four power cabinets 3 in which:
         1. bottom section 26 and upper section 27 (see FIG. 4A) may be removable to allow access to connection points and internal components, and
         2. control panels 9 may be housed when not in use;
      ii. eight fixture storage and transportation cabinets,
      iii. eight electrical wiring and accessory storage cabinets,
      iv. two hardware storage and transportation cabinets, and
      v. one auxiliary fixture and accessory storage cabinet (of approximate size 36"×25"×27");
   b. mounting structures for fixtures including:
      i. four poles (see FIGS. 1 and 3C),
      ii. sixteen mount feet (see FIG. 3A), and
      iii. four pole clamp assemblies (see FIG. 3B);
   c. auxiliary fixtures including twelve bollard-type fixtures,
   d. an air compressor with four portable air tanks,
   e. two generators 1 for producing electrical power, and
   f. optional spare, accessory, or auxiliary components.

To further aid in mobility, cabinets are equipped with wheels and pull-type handles. For example, during site setup for the system illustrated in FIG. 1 power cabinets 3 may be rolled about the site to allow convenient staging of the equipment at the desired locations. This permits a limited number of persons to install the system in preparation for the lighting evaluation.

To ensure electrical power is available at the desired location and in sufficient capacity to support the power needs of the mobile lighting evaluation system, generators 1 are used to provide electrical power to fixtures 4, power cabinets 3, and control panel 9. Generator 1 also provides electrical power for any tools or other ancillary equipment needed for setup or operation of the system (e.g., air compressor). Generator 1 may be mounted in trailer 2 (as is illustrated in FIG. 1) or may be portable with wheels to allow placement as needed at the site. Generator 1 may be fuel-powered with gasoline, kerosene, propane gas, or otherwise.

It is of note that mobility components may differ in composition and/or quantity from those described herein. For example, the mobile lighting evaluation system may comprise eight bollard-type fixtures (rather than twelve) or cabinets measuring 46"×46"×46" (rather than 26"×23"×23"). As another example, mounting structures may further comprise devices to enable fixtures 4 to be suspended from a surface (e.g., ceiling). Such differences in componentry do not limit the portability and usefulness of the mobility components aspect of the mobile lighting evaluation system.

2. Lighting Components—Apparatus, Methods, and Systems

As envisioned, the lighting components of the mobile lighting evaluation system comprise fixtures, components to be used with fixtures to vary lighting characteristics, mounting components for the fixtures to interface with support structures and positioning devices, and electrical power connection components to interface with control panels and power cabinets. The lighting components are designed to be portable, weather-hardy, and adjustable to facilitate evaluation of various lighting schemes, and may generally be characterized by the following.

A. Lighting Fixtures

Primarily, fixtures used in the mobile lighting evaluation system are area lighting or floodlight-type fixtures weighing approximately 4 lbs and measuring approximately 12"×16"×3", with each fixture capable of producing several thousand lumens of light output when operated at full power (i.e., rated operating power). As may be seen from FIGS. 2A and 2B, fixtures 4 make use of solid-state lighting technology (in this example, commercially available LEDs) mounted in an array (in this example 84 LEDs wired as twelve parallel strings of seven LEDs each). The fixture housings are constructed of aluminum (or aluminum alloy) and include an integral finned heat sink 6. The aluminum construction provides good thermal conduction to draw heat away from the LEDs, is lightweight for ease of handling, and, as is well known in the art, resistant to adverse environmental effects (e.g., corrosion). The LED light sources are affixed to a circuit board (not illustrated) by means well known in the art and positionally held constant with respect to each other and with respect to some reference feature of the circuit board (e.g., screw hole). A hinged lid 10 with transparent lens encloses the LED light sources and optics panel 7 (see FIG. 2B). The frame of the lid contains integral tracks 11 to accept interchangeable inserts 5 (e.g., color gel panels, diffuser panels, etc.) to be optionally mounted on the exterior side of the lid lens (see FIG. 2A) and positionally held (e.g., by spring catch). Inserts 5 may comprise gels for color temperature adjustment, diffusers to further modify light distribution, some combination or plurality thereof, or other component sized for integral tracks 11.

1. Optics Panel

Optics panel 7 comprises an optical element (in this example, a reflector 8) for each light source of fixture 4 whereby the spacing or array of the optical element mimics the LED light source array. Optics panel 7, which is removably affixed to fixture 4 (in this example, by four shoulder bolts 25), may comprise various types and arrangements of optical elements (e.g., lenses, reflectors 8, etc.) which allow various configurations of beams to be created and, therefore, various ways to control the distribution of light as desired. For example, optics panel 7 configurations may include an 8 degree narrow spot beam (cylindrical) and 150 degree asymmetric flood beam; these configurations are discussed in greater detail in U.S. patent application Ser. No. 12/467,160 issued as U.S. Pat. No. 8,356,916 on Jan. 22, 2013, which is a conversion of U.S. Provisional Patent Application No. 61/097,483, both of which are incorporated by reference herein. Other arrangements of optical elements are possible, and envisioned.

2. Color Gel Panel

In this embodiment each fixture 4 comprises LED light sources which produce a base color temperature of approximately 4200 K, though this is by way of example and not by way of limitation. To adjust the color temperature of the light output from fixture 4, inserts 5 comprised of color gels may be used to alter the color to be warmer or cooler (as is defined in the art of lighting) than the base color. For example, to achieve a warmer color of 3500 K, a red-toned color gel may be inserted into track 11 exterior to hinged lid 10 to alter the overall color of the light output from fixture 4. If a cooler color is desired (e.g., 5600K), then a blue-toned color gel may be used. Other color gel panels are possible, and envisioned.

3. Diffuser Panel

As has been stated, fixture 4 may include various optical element arrangements—via optics panel 7—which provide various beam pattern configurations. Projected beam patterns may be further modified by using inserts 5 comprising diffuser panels. Diffusion panels have a similar effect to changing the optical elements used in fixture 4, but may be used with limited effort and without opening hinged lid 10. Diffusion panels may be used to emulate, enhance, or exaggerate the effects of certain optical element arrangements, allowing a quick and easy change in the beam shape without the use of tools, which increases the usefulness of the system as an evaluation, demonstration, and teaching tool. Examples of diffuser panels include, but are not limited to, 10 degree, 30 degree, 80 degree, elliptical 10×60 degree, and elliptical 60×90 degree, and may be commercially available (e.g., any of the Light Shaping Diffuser sheets available from Luminit, Torrance, Calif., U.S.). Essentially, each insert 5 diverges light a specified amount, emulating a negative lens. Symmetrically diverging inserts (e.g., 10 degree) diverge light evenly and elliptical inserts (10×60 degree) diverge light at two different specified angles which are orthogonal to each other.

For example, fixtures 4 have a long axis which may typically be mounted approximately horizontally (see FIGS. 3A-C). The location of insert mounting track 11, which is installed on the exterior face of hinged lid with transparent lens (collectively referred to as reference no. 10), may be considered the face plane. Accordingly, the elliptical inserts may be constructed and mounted such that the smaller angle of divergence is centered with reference to a plane that is through the long axis and perpendicular to the face plane. The larger angle of divergence may then be centered about a plane that is perpendicular to the first plane and is also perpendicular to the face plane. However, the elliptical inserts may also be constructed and mounted such that the wider (rather than narrower) angle of divergence is centered with reference to the long axis of fixture 4. Other divergence angles for both symmetrical and elliptical inserts are possible, and envisioned.

It is of note that insert 5 (whether comprising a color gel, diffuser, some plurality or combination thereof, or otherwise) may further comprise some type of frame to provide rigidity for the film material. One method may be to use a transparent material (e.g., polycarbonate) that is more rigid than the gel film or sheet as a frame. The color gel film may be overlaid onto the frame material—or even between layers of the frame material—to create a more rigid panel that may be inserted into track 11 of fixture 4. It is of further note that radiant heat from fixture 4 is not typically a concern when using LED sources, thus inserts 5 may be located in close proximity to hinged frame 10.

4. Integration with Other Relating Components Fixtures 4 are mounted to various structures by a framework 13 (see FIGS. 3A-C); framework 13 is affixed to fixtures 4 via a connective device 12 (see FIG. 2A) which is fed through apertures in framework 13 into apertures in either side of fixture 4.

Fixtures 4 receive electrical power from power cabinets 3 (see FIG. 1) which may be controlled via control panel 9 located at power cabinet 3 (see FIGS. 4A and 4B). Control panel 9 communicates with power cabinet power supplies 15 to establish a drive level or power level at which fixtures 4 are operated. Fixture 4 is internally wired to a weather-hardy electrical connector that is affixed in the fixture housing and adapted to mate with power cabinet fixture cable 80 at connector 14.

B. Alternate or Additional Lighting Fixtures

One type of fixture that may be included in the mobile lighting evaluation system is a bollard-type or pathway light fixtures. One example of such a light fixture with integral power source (and, optionally, means for dimming and remote control) is discussed in U.S. patent application Ser. No. 12/113,838, issued as U.S. Pat. No. 7,976,199 on Jul. 12, 2011 and incorporated by reference herein. Additionally, other specialized fixtures may be included in the system as needed.

3. Electrical Components—Apparatus, Methods, and Systems

As envisioned, the electrical components of the mobile lighting evaluation system comprise those which provide power to the system and those which regulate power to the system, and may generally be characterized by the following.

A. Site Power

Power for operation of the mobile lighting evaluation system may be obtained from typical existing site power (e.g., 120 VAC) of suitable amperage capacity or may be provided by portable generators (see reference no. 1) included as components of the overall system. One advantage of using portable generators 1 is that power of a known capacity is readily available regardless of site location, existing site power, or otherwise. In this embodiment the mobile lighting evaluation system uses two portable generators 1 (e.g., model EB6500XA available from American Honda Power Equipment Division, Alpharetta, Ga., U.S.), though this is by way of example and not by way of limitation. For example, generators 1 may be optionally fitted with wheels and handles to provide ease of mobility. Generators 1 may be housed in transport vehicle (see reference no. 2) or positioned where needed on-site. One advantage of utilizing multiple generators 1 is that they may be located at different locations of the site and provide power to the equipment in the local vicinity of each. Incoming 120 VAC line from generator(s) 1 or a locally available power source supplies power to power cabinets 3. As may be seen from FIG. 1, power to power cabinets 3 is divided between two cables to limit the power load to less than 20 amps per circuit, which is a typical circuit capacity for 120 VAC circuits. This also reduces the ampacity requirements on the wire, allowing for smaller wire sizes and less weight for the cords. AC cables which deliver power have connectors that mate with the connection point at the power source (e.g., generator 1) and twist lock connector (the use of which is well known in the art) at power cabinet 3.

B. Lighting Components Power

As may be seen from FIG. 5A, site power entering power cabinet 3 (see reference caption "AC IN") is delivered to fixture power supplies 15 and a 24 VDC power supply. The 24 VDC power supply powers control panel 9 and two auxiliary fans 18 which are used to draw up filtered air from the bottom of cabinet 3 and maintain a positive pressure inside the power cabinet cavity 40 where fixture power supplies 15 are housed (see FIG. 4B). Auxiliary fans 18 include a tachometer feature to produce a feedback signal to control panel 9 to indicate operation. To protect against potential overheating and damaging components housed in cabinet 3, if the feedback signal is not received by a control board circuit 17 (see FIG. 5B), operation of power supplies 15 is disabled.

C. Fixture Power Supplies

Power supplies 15 (e.g., model Y040LX1800 available from Acopian Technical Company, Easton Pa., U.S.) convert incoming site power from AC to DC and supplement efforts of auxiliary fans 18 via integral fan cooling systems. Each power supply 15 is generally connected to a single fixture 4 via DC cable 80. When preferable, a power supply 15 may power two fixtures 4 via an optional Y-cable 82 (as for Fixtures #4 and #5); in this embodiment a maximum of eight fixtures 4 may be powered by a single control cabinet 3. When two fixtures 4 are powered by single supply 15 an intermediate DC cable 81 (essentially a shorter version of cable 80, though cable 80 may be used in place of cable 81) is connected to power supply 15 and optional Y-cable 82. Cables 80 and 81 are enabled with a connection point (e.g., terminal, wire end, etc.) which is not in use when operating a single fixture 4. When Y-cable 82 is connected, the unused connection point of cable 80/81 is brought into use such that connection of Y-cable 82 produces a feedback signal to control panel 9 such that an appropriate control voltage may be provided by a control board circuit (see reference no. 17).

Each power supply 15 in power cabinet 3 receives a 0-10 VDC input signal from control board circuit 17 (which may be housed in control panel 9). Power supply 15 is programmed to produce a given voltage and current output based on the value of the control voltage (i.e., 0-10 VDC). The control voltage may be programmed, limited, or otherwise controlled in accordance with a number of factors including, but not limited to, number of fixtures (i.e., one or two) connected to power supply 15, wattage rating of fixture 4, and operating temperature. For example, fixture 4 illustrated in FIGS. 2A and 2B has a maximum design operating wattage of 318 W at the maximum operating temperature of 40 degrees Celsius. Control board circuit 17 may produce a control voltage of 10 VDC (correlating to 485 W) but a signal of that magnitude may result in damage to fixture 4. However, the same power supply 15 operating two fixtures 4 may receive the full control voltage (i.e., 10 VDC) with no damage to fixtures 4; as previously stated, feedback from connection of Y-cable 82 is recognized by control board circuit 17 which permits the larger control voltage.

D. Control Panel

Control of each power cabinet 3 is enabled by a control panel 9 which may be housed in power cabinet 3 when not in use; as illustrated in FIG. 4A, control panel 9 is stored in removable section 26 of power cabinet 3, though this is by way of example and not by way of limitation. Control panels 9 from multiple power cabinets 3 may be brought into operable connection via RS-485 cable to facilitate, as will be described, operation of the entire mobile lighting evaluation system from a single control panel 9.

1. Control Board Circuit

As may be seen from FIG. 5B, control board circuit 17 (e.g., model BL2100 available from Rabbit, Davis, Calif., U.S.) receives inputs comprising power level control for each zone, overall power level control, zone selection, and master/local operating mode which may be facilitated from a user interface 19 (see FIG. 6). For example, a user may adjust a dial 22 (or other manually operated member) on user interface 19 which corresponds to Zone 1. Adjustment of said dial 22 produces a level control signal (i.e., Level Control #1, FIG. 5B) to control board circuit 17 which, in turn, produces a 0-10

VDC control voltage to the corresponding power supply 15 (i.e., Power Supply #1) which, in turn, provides corresponding fixture 4 (i.e., Fixture #1) with the appropriate operating wattage.

Further, control board circuit 17 produces an output inhibit signal to each power supply 15 when the control panel user interface instructs fixtures 4 to be turned off. This ensures that no power is being supplied to fixtures 4, even if control board circuit 17 outputs a low control voltage signal based on the some trace signal from the user interface.

2. User Interface

As may be seen from FIG. 6, control panel 9 is equipped with a user interface 19 by which a plurality of manually operated members (e.g., dials, switches, toggles, etc.) may be enabled to control the lighting effects of each fixture 4. Functionality of user interface 19 may generally be characterized by the following.

- a. Dimming and brightening of fixtures 4 may be enabled by a dial potentiometer 22 such that each dial 22 directs the control voltage provided to a corresponding power supply 15.
  - i. As described herein, this potentiometer is characterized as a three-terminal resistor with a sliding contact that forms an adjustable voltage divider.
  - ii. As there is one potentiometer 22 for each power supply 15, two fixtures connected to a single power supply (as in Fixture #4 and Fixture #5 in FIG. 5A) will dim and brighten in unison when dial 22 is adjusted.
- b. Zone selection may be facilitated by step dial 20 such that, for the system illustrated in FIGS. 5A and 5B:
  - i. when switched to OFF, power to all fixtures 4 is disabled;
  - ii. when switched to A, power to Fixtures #1 and #3 is enabled and power to Fixtures #2, #4, and #5 is disabled;
  - iii. when switched to B, power to Fixtures #2, #4, and #5 is enabled and power to Fixtures #1 and #3 is disabled; and
  - iv. when switched to A+B, power to all fixtures 4 is enabled.
- c. Rapid power control of an active zone may be facilitated by step dial 21 such that setting H allows for full power, setting M allows for ⅔ power, and setting L allows for ⅓ power.
  - i. For example, if dial 20 is set to A, Zone 1 dial 22 is set to 50%, and Zone 3 dial 22 is set to 0%, adjustment of dial 21 from setting H to setting M will result in a reduction to ⅔ power for both Zones 1 and 3 (i.e., 33% for Zone 1 and 0% for Zone 3).
- d. Master/local toggle 24 may be used when multiple control panels 9 are interconnected to indicate which user interface may be used to control all connected control panels 9 (i.e., master).
- e. Display 23 may be used to display pertinent data (e.g., power consumption) associated with an active zone (as determined by dial 20) by cycling through data channels on a touch pad. An optional series of indicators (in this example, a plurality of LEDs) may be used to indicate a variety of fault conditions (e.g., auxiliary fan 18 failure, multiple interconnected control panels 9 operating in master mode, etc.).
  - i. If control panel 9 is set to master mode (via toggle 24), display 23 may indicate pertinent data for all interconnected cabinets 3 for an active zone. Alternatively, if control panel 9 is set to local mode, display 23 may indicate pertinent data for the corresponding cabinet 3 only.
  - ii. In the present embodiment, displayed power consumption is not directly measured; voltage inputs to fixtures 4 are compared to reference tables stored in control panel 9 and the power consumption calculated accordingly. Other determined (whether by estimation, calculation, or otherwise) and displayed data are possible, and envisioned.

3. Operating Modes

There are three master/local operating modes (i.e., local when not connected to any other control panels, master when connected to other control panels, and local when connected to other control panels) for a given control panel 9 which may generally be characterized by the following.

- a. Local when not connected to any other control panels
  - i. When a single control panel 9 is operated in local mode, power to each of four power supplies 15 may be controlled individually via potentiometer dials 22, but not collectively via step dials 20 and 21.
  - ii. If the operating mode is toggled to master when there are no other control panels 9 connected, power to each of four power supplies 15 may be controlled collectively via step dials 20 and 21, but not individually via potentiometer dials 22.
- b. Master when connected to other control panels
  - i. When a control panel 9 is connected to other control panels 9 and the operating mode is toggled to master, all of the other control panels 9 must be toggled to local for the interconnected control panels 9 to operate correctly.
  - ii. Step dials 20 and 21 on the master will control the zone selection and power level for all local control panels 9, respectively. However, power supplies 15 may not be controlled individually via potentiometer dials 22 for any of the interconnected control panel 9 (whether in master or local mode).
- c. Local when connected to other control panels
  - i. When a control panel 9 is connected to other control panels 9 and the operating mode is toggled to local, only one other control panel 9 may be toggled to master for the interconnected control panels 9 to operate correctly.
  - ii. Step dials 20 and 21 on the master will control the zone selection and power level for all local control panels 9, respectively. The only dial setting that may be made from a control panel 9 both connected to other control panels 9 and operated in local mode is switching step dial 20 to OFF; this disables power to each supply 15 in said control panel 9. All other local control panels 9, as well as master control panel 9, will function normally.

4. Structural Components—Apparatus, Methods, and Systems

There are a variety of ways to support fixtures 4 in a desired position for evaluation of a lighting scheme, as well as support the portability and weather-hardy aspects of components of the mobile lighting evaluation system. Several examples are presently discussed, though other types of structural components are possible, and envisioned.

A. Support of Fixtures

As previously stated, fixtures 4 are enabled with a yoke-style framework 13 (see FIGS. 3A-C); framework 13 is designed to be universally applied to fixtures 4 yet adaptable to various supports structures in the mobile lighting evaluation system. In this embodiment, framework 13 may be constructed from formed aluminum (or aluminum alloy) bar or plate into a general U-shape with holes 28 to mount framework 13 to the sides of the fixture housing. Connective devices 12 (in this example, threaded hand knobs) may be used to secure framework 13 to the fixture housing and provide a tool-free method of (i) loosening to allow for tilting (i.e., vertical orientation) fixture 4 during the aiming process, and (ii) tightening to secure fixture 4 in an orientation. Hole 28 in the center of framework 13 provides for quick attachment of fixture 4 to a support structure using a spring-loaded hitch pin style clamp assembly 29, as well as providing a pivot point for orientation of fixture 4 about the elongated axis of a support structure (e.g., pole 30). Clamp assembly 29 may comprise a threaded set screw with lever arm to positionally hold fixture 4 in an orientation. Additional holes 28 in framework 13 may be used in conjunction with clamp assemblies 32 to secure support feet 31 to fixture 4; clamp assemblies 32 may be of a spring-loaded hitch pin design similar to clamp assembly 29. It is of note that hitch pin clamps are well known in the art; as such, details of its operation are omitted from this text.

1. Pneumatic Aerial Pole

A portable support pole (see reference no. 30) that is capable of telescoping to elevated heights may be used to mount one or more fixtures (see FIG. 1). In the present embodiment, pole 30 may be commercially available telescoping pole model Genie Super Hoist GH-5.6 that is capable of lifting 250 lbs to a height of 18 ft, though this is by way of example and not by way of limitation. To mount fixtures 4 to pole 30, a support arm 33 is attached to the top mast of pole 30 and secured with a fastening device (in this example, a threaded bolt). Support arm 33 may be constructed of an aluminum or aluminum alloy member (e.g., tube, bar, angle, channel, etc.) suitable to (i) support fixture 4 weight, and (ii) provide for fixture 4 attachment. One example of support arm 33, shown in FIG. 3C, illustrates a flat bar approximately 30" in length with a center point secured to the top mast of pole 30 via clamp assembly 34 (shown by way of example and not by way of limitation to be a hitch pin clamp with set screw affixed to support arm 33 similar to clamp assemblies 29 and 32). Fixtures 4 may be oriented about the elongated axis of support structure 30 (i.e., horizontally oriented) by pivoting framework 13 about the hitch pin of clamp assembly 34 and tightening the set screw level when fixture 4 is in the desired orientation. Other pole mounting systems are possible, and envisioned. For example, support arm 33 may be designed to support a larger number of fixtures 4 by elongating the length of support arm 33; in this embodiment pole 30 has a lift capacity of 250 lbs and each fixture 4 weighs approximately 4 lbs so support of multiple fixtures is possible. Alternatively, a second support arm 33 may be added to the design at an angle offset from first support arm 33 such that second arm 33 may be secured to pole 30 by the same clamp assembly 34. As another example, pole 30 may be equipped with guy wire attachment points on the pole mast to allow for tie-down rope or wires to be used to prevent the pole from adverse movement (e.g., due to an imbalanced load, high winds, or otherwise).

2. Ground or Floor Mount

To support fixtures 4 near the ground or floor (see FIG. 1), support feet 31 are affixed to framework 13. Support feet, in this embodiment and illustrated in FIG. 3A, may be constructed of formed aluminum or aluminum alloy plate and clamped to framework 13 through a common mounting hole. Clamp assembly 32 allows for quick attachment or removal of support feet 31. Other options are possible for support feet 31, and envisioned. For example, feet 31 may include protective material such that feet 31 may not scuff or mar flooring. As another example, feet 31 may include wheels to increase portability of fixtures 4.

3. V-Clamp for Existing Structure

To affix fixtures 4 to an existing structure (e.g., utility pole, structural component of a building, tree, etc.) a v-clamp assembly 35 (see FIG. 3B) may be used. V-clamp assembly 35 comprises a v-shaped frame 36 that is clamped to the structure using a flexible strap 37 and secured with a ratchet strap tightener 38 (the use and function of which is well known in the art). V-clamp assembly 35 further comprises a plate 39 by which a variety of frameworks or support arms may be affixed. In this example, fixture 4 is affixed to plate 39 by framework 13, clamp assembly 29, and a mating plate bolted to plate 39, though this is by way of example and not by way of limitation. Other options for v-clamp assembly 35 are possible, and envisioned. For example, v-shaped frame 36 may include a material on the inner surface (i.e., the surface in contact with the existing structure) to provide friction. As another example, strap tightener 38 may be of a hook and pin nature (rather than ratchet).

B. Power Cabinet

As has been stated, power cabinet 3 houses power supplies 15, fans 18, and control panel 9 (when not in use), as well auxiliary and electrical equipment associated with the use of said housed components. In the present embodiment, power cabinet 3 may be a rigid-sided case (to protect housed components against both damage and adverse environmental conditions), designed with removable sections 27 and 26 (to allow access of control panel 9 and power cords, and to make weather-hardy electrical connections at plate 41), and designed with wheels and telescoping pull handle (to facilitate portability). When section 26 (which is approximately 4" deep) is removed, power cabinet 3 is supported by legs affixed to power cabinet 3 which allow clearance for (i) air flow, and (ii) cords connected at plate 41).

To support or mount various electrical components, support structures or features (e.g., brackets, clamps, housings, etc.) may be added to power cabinet 3. For example, power supplies 15 may be vertically oriented side by side and mounted (by methods well known in the art) to a sheet metal housing within cabinet 3.

C. Control Panel

Control panel 9 housing may be designed to protect electronic components against both damage and adverse environmental conditions, and may be constructed of aluminum or aluminum alloy) for durability and light weight. In the present embodiment, the housing may be constructed in pieces that are assembled together to form the housing and include a scaling gasket (i.e., weather-hardy seal), though this is by way of example and not by way of limitation. The housing includes a bracket assembly 42 which comprises a bracket (to affix control panel 9 to the handle of power cabinet 3 such that user interface (see reference no. 19) may be easily viewable), and radial slots with associated fastening devices (to both allow tilting of control panel 9 and positionally hold control panel 9 in an orientation). Bracket assembly 42 is constructed of formed sheet metal and is secured to control panel 9 housing machine screws, though this is by way of example and not by way of limitation.

C. Exemplary Method and Apparatus Embodiment 2

Modification of the system described in Exemplary Method and Apparatus Embodiment 1 such that control of the mobile lighting evaluation system may be effectuated wirelessly from a controller located geographically remote from the mobile lighting evaluation system is presently discussed.

There are many benefits to wirelessly controlling the mobile lighting evaluation system which may include, but are not limited to, the following:

a. it allows a user to visually ascertain correct operation of all components of the mobile lighting evaluation system from one vantage point, b. it allows a customer to gain an appreciation for the overall aesthetic effect of the mobile lighting evaluation system, c. it allows a user and/or customer to more readily determine possible fixture locations, and d. a user can more readily obtain operating parameters/data for a given lighting scheme and, optionally:

i. save a profile which corresponds to a lighting scheme for later use, ii. export data to some other program, and iii. present the data in a user-friendly format to the customer such that the customer may correlate an overall aesthetic with changes in operating parameters.

1. Wireless Networking

The general methodology of facilitating wireless communication in the mobile lighting evaluation system is presently discussed. However, it is of note that fundamentals of wireless networking and the implementations of such are well known in the art and so are not discussed in detail in this text.

As envisioned, all interconnected control panels 9 are set to local mode. One control panel 9 is enabled with both control board circuit 17 and a wireless module. Control board circuit 17 of said enabled control panel 9 provides an embedded web server which serves web pages to the wireless module. Signals from the wireless module are transmitted to a wireless card in a user interface (in this example, a laptop) and manifest as viewable pages via commercial browser (in this example, INTERNET EXPLORER®). Signals are communicated using 802.11b and/or 802.11g protocols (also referred to as Wi-Fi) of the Institute of Electrical and Electronics Engineers (IEEE) 802.11 standard. While the use of the 802.11 standard provides many benefits (e.g., security features, availability of communication channels, commercial equipment availability, etc.), other protocols may be used.

Essentially, the mobile lighting evaluation system uses commercially available equipment integrated with an existing control board circuit 17 to create a local area network (LAN) that does not rely on a router. This approach allows wireless components at control panel 9 to communicate directly to wireless components at a wireless user interface which results in a reliable method of sending and receiving signals and maintains the portability aspects of the mobile lighting evaluation system. As a further benefit, this approach allows a user to control the mobile lighting evaluation system from any of the interconnected local mode control panels, or from a wireless user interface, or from both.

2. Mobility Components—Apparatus, Methods, and Systems

In this alternative embodiment, mobility components comprise those described for Exemplary Method and Apparatus Embodiment 1. Many of the components required to facilitate wireless communication from control panel 9 to a user interface (see reference no. 100) are housed in control panel 9 and power cabinet 3 (see FIGS. 7A and 7B). Components not housed in control panel 9 or power cabinet 3 (e.g., antenna 50) may readily be housed in other cabinets or trailer 2; alternatively, a cabinet (of a size similar to those described in Exemplary Method and Apparatus Embodiment 1) dedicated to the wireless communication components may be added to the mobile lighting evaluation system.

3. Lighting Components—Apparatus, Methods, and Systems

In this alternative embodiment, lighting components comprise those described for Exemplary Method and Apparatus Embodiment 1. As envisioned, primary fixtures 4 may be controlled wirelessly via user interface (see reference no. 100) whereas any auxiliary fixtures (e.g., pathway lights) are controlled manually; however, this is by way of example and not by way of limitation. The apparatus and methods described herein may be applied to auxiliary fixtures.

4. Electrical Components—Apparatus, Methods, and Systems

In this alternative embodiment, electrical components comprise (i) those described for Exemplary Method and Apparatus Embodiment 1, and (ii) those which facilitate wireless networking either by modifying existing components or introducing new components into the mobile lighting evaluation system. As envisioned, wireless networking may be facilitated over a short range (on the order of several hundred feet) or over a long range (on the order of tens of thousands of feet); FIGS. 7A and 8A illustrate the mobile lighting evaluation system when operating in short range mode, and FIGS. 7B and 8B illustrate the system when operating in long range mode.

A. Control Panel

As can be seen from FIGS. 7A and 7B, control panel 9 has been modified to include a Wi-Fi core module 44 (e.g., model MiniCore RCM5600W available from Rabbit, Davis, Calif., U.S.) which is in operative connection with control board circuit 17 via RS-232 cable (see FIGS. 8A and 8B). In short range mode (see FIG. 7A), module 44 is in operative connection with an antenna 43 (which is typically supplied with a Wi-Fi module when purchased) which is removably affixed to the housing of control panel 9. In long range mode (see FIG. 7B), module 44 is brought into operative connection with an amplifier 45 (e.g., model AMPOD-24-1000 available from Luxul Wireless, Lindon, Utah, U.S.) via coaxial cable sections which mate at weather-hardy electrical connection 47. Amplifier 45 is then brought into operative connection with a high gain antenna 50 (e.g., model GNS-1419 available from GNS Wireless, Bayport, N.Y., U.S.) via coaxial cable sections which mate at weather-hardy electrical connection 46.

B. Power Cabinet

As can be seen from FIGS. 7A and 7B, power cabinet 3 has been modified to further comprise amplifier 45 (in this example, mounted to the inner wall of power cabinet 3 by methods well known in the art) and two coaxial cable sections which terminate at plate 41. When the mobile lighting evaluation system is operated in short range mode (see FIG. 7A), amplifier 45 is not used. When operating in long range mode (see FIG. 7B), amplifier 45 is brought into operative connection with both antenna 50 and Wi-Fi module 44 when coaxial cable sections are mated at connections 46 and 47, respectively. As envisioned, amplifier 45 is powered by the same 24 VDC power supply which powers auxiliary fans 18 and control panel 9, thought this is by way of example and not by way of limitation.

C. User Interface

A user interface (in this example, a laptop), which receives signals from and sends signals to wireless components housed at control panel/power cabinet 9/3 is illustrated in FIG. 9. User interface 100 comprises wireless components analogous to those in control panel/power cabinet 9/3 to facilitate wireless networking. For example, user interface 100 is enabled with a wireless card supported for use with high-gain antennas (e.g., model SR71-X available from Ubiquiti Networks, San Jose, Calif., U.S.), which is housed in port 108 of user interface 100 and is analogous to Wi-Fi core module 44 housed in control panel 9. In short range mode, an antenna 43 is removably affixed to the wireless card in user interface 100 in the same manner by which an antenna 43 is removably affixed to module 44 in control panel 9. In long range mode, antenna 43 is removed from the wireless card housed in port 108 and a coaxial cable (which is connected to amplifier 45 and antenna apparatus 50/49/48 at the other end, e.g., FIG. 7B) is connected in its place; this is analogous to long range mode operation at control panel/power cabinet 9/3. Whereas amplifier 45 draws power from an existing power supply in cabinet 3, amplifier 45 at user interface 100 is powered by a battery pack or analogous power source.

Operation of control section 106 of user interface 100 to facilitate control of fixtures (see reference no. 4) is analogous to operation of user interface 19 of control panel 9 described in Exemplary Method and Apparatus Embodiment 1. For example, through use of touch pad, external mouse, keyboard 101, or otherwise, zone control may be effectuated by selecting the appropriate values in area 104 in the same manner as rotating dials 22. In Exemplary Method and Apparatus Embodiment 1, when control panels/power cabinets 9/3 are added or removed from a series of interconnected control panels 9 (with one in master mode and the others in local mode) the master mode control panel recognizes the addition/deletion and continues to operate all remaining interconnected power cabinets. Similarly, in this embodiment as control panels/power cabinets 9/3 are added or removed from a mobile lighting evaluation system, their functionalities may be added or removed from user interface 100 by a network setup function 107; display 103 indicates power cabinets 3 active in the system. It is of note that one skilled in the art of wireless networking would know how a device (in this example, a power cabinet 3) is configured for a wireless network; as such, the details of network setup function 107 have been omitted.

Additionally, user interface 100 adds functionality beyond that provided by control panel 9 in Exemplary Method and Apparatus Embodiment 1. For example, a user may elect to view pertinent data of (i) all interconnected cabinets 3, or (ii) an individual cabinet 3 by view selection 102. As another example, toggling a global selection function 113 allows a user to control operating parameters of (i) all interconnected cabinets 3 in unison, or (ii) any cabinet 3 listed in display 103 individually. As another example, functionality common to laptops (e.g., ability to interface with a printing device, file saving and sending capabilities, etc.) provides user interface 100 with the potential to store and recall pertinent data, as well as export or format the data for other uses.

It is of note that compositional and functional aspects of user interface 100 may differ from those described herein. For example, user interface 100 may be enabled with preset illumination schemes comprising specific operational settings for each fixture 4 such that a user may readily recall such schemes for any purpose (e.g., to compensate for lumen depreciation). As another example, a handheld-style device 120 (see FIG. 10) may be used in lieu of a laptop (as is illustrated in FIG. 9).

5. Structural Components—Apparatus, Methods, and Systems

There are a variety of ways to support wireless networking components—both at control panel/power cabinet 9/3 and at the user interface (see reference no. 100)—of the mobile lighting evaluation system. Several examples are presently discussed, though other types of structural components are possible, and envisioned.

When the mobile lighting evaluation system is operated in short range mode, antenna 43 is removably affixed to the housing of control panel 9 by a panel mount-type connector (e.g., model MB11NFP1 available from City Technology, Maffra, Victoria, Australia) and antenna 50 is not in use (i.e., stored in trailer 2 or otherwise). When the mobile lighting evaluation system is operated in long range mode, antenna 43 is removed from control panel 9 and antenna 50 is supported on base 48 (which is also used as a base for auxiliary bollard fixtures, though this is by way of example and not by way of limitation) via pole 49 which comprises collapsible aluminum or aluminum alloy pole sections. Pole 49 may be built to any desired height by adding pole sections to facilitate line-of-sight wireless communication between antenna 50 of control panel/power cabinet 9/3 and antenna 50 of user interface 100. As envisioned, antenna 50 is a sector antenna; as such, hardware for affixing to a pole (in this example, pole 49) is typically provided by the manufacturer. Optionally, an omni-directional antenna may be used in place of the directional sector antenna described herein; with this option a connective device (e.g., bracket, clamp, etc.) may be needed (purchased separately or developed) to affix the antenna to pole 49.

D. Options and Alternatives

The invention may take many forms and embodiments. The foregoing examples are but a few of those. To give some sense of some additional options and alternatives, a few examples are given below.

The mobile lighting evaluation system described in the exemplary embodiments may be designed to be scaleable to accommodate a variety of site location sizes and topographies. For example, a smaller site may require a single power cabinet 3 whereas a large site area may require four power cabinets with two fixtures 4 for each power supply 15. As another example, a smaller site may not require use of the high gain antenna (i.e., may only need to be operated in short range mode). As another example, site location topography may require the use of an omni-directional high gain antenna when operated in long range mode.

Components of the mobile lighting evaluation system described in the exemplary embodiments need not be comprised primarily of aluminum or aluminum alloys, as has been described herein. While aluminum is light-weight and weather-hardy, other materials or alloys may be used. Further, components of the mobile lighting evaluation system need not comprise the support components and fastening devices described herein. For example, pole 30 may not be necessary if fixtures 4 may be suspended from a building overhang. As a further example, four shoulder bolts 25 may not be necessary to removably affix optics panel 7 to fixture 4 if a single shoulder bolt 25 or some other form of fastening device (e.g., clamp) may suffice.

Fixtures may differ in quantity and type from those described in the exemplary embodiments. For example, more than two fixtures 4 may be supported by each power supply 15 and more than four power supplies 15 may be housed in power cabinet 3. As another example, fixtures may comprise light sources other than LEDs or LEDs arranged in arrays other than twelve parallel strings of seven LEDs each. As another example, 4200K base color LED light sources described herein may be replaced with RGB LED light sources. As another example, multiple integral tracks 11 may be included in the fixture housing such that multiple inserts 5 may be used with a fixture 4.

The user interfaces described in both Exemplary Method and Apparatus Embodiments 1 and 2 may be adapted or otherwise configured to directly export operating parameters/data to some other program (e.g., modeling software, spreadsheet). Alternatively, the user interfaces may be adapted or otherwise configured to connect to a printer (or other recording device) such that operating parameters/data may be recorded. Further, said user interfaces may comprise alternative or additional display functionality. For example, an economic cost (e.g., $/yr) may be displayed given known operating conditions (e.g., watts/fixture and number of fixtures) and known inputs (e.g., $/kW-hr as charged by a power distributing company), and change in response to changes made on the user interface to said operating conditions. As another example, a data field may be included to display an overall capital cost for a permanent system based on components used in a particular illumination scheme (e.g., number and type of light sources, color gels, and diffusers), which may change in response to changes made in a data field on the user interface which includes components. As another example, a data field may be included to record environmental conditions or other factors (e.g., an overcast day, other ambient light sources illuminating an object, etc.) which may impact the effectiveness of an illumination scheme. Still further, said user interfaces may be powered by means other than those described herein. For example, control panel 9 may be powered by a battery pack contained in the control panel housing (rather than powered by the 24 VDC power supply housed in power cabinet 3).

Wireless communication between components in control panel/power cabinet 9/3 and components in user interface 100 (or alternatively, 120) may differ from the methods described herein to include such modes and mediums as cellular signal, radio frequency (RF), infrared radiation (IR), or otherwise. Any such change to the methods described herein may require appropriate changes to apparatus herein. Further, methods of wireless networking may differ from those described herein. For example, different operating protocol may be used (rather than 802.11b and/or 802.11g). As another example, a different browser may be used (rather than INTERNET EXPLORER®). Still further, wireless communication between components in control panel/power cabinet 9/3 and components in user interface 100 (or alternatively, 120) may be such that when control panels/power cabinets 9/3 are added to mobile lighting evaluation system, network setup function 107 automatically recognizes the addition and adds the new control panels/power cabinets 9/3 to display 103.

What is claimed is:

1. A system for on-site simulation, evaluation, or demonstration of an illumination scheme comprising:
   a. a plurality of portable and aimable lighting fixtures configured to provide on-site evaluation and demonstration of illumination schemes, each lighting fixture with a plurality of solid-state lighting sources, the lighting fixtures having adjustable lighting characteristics including all of:
      i. illumination level;
      ii. color temperature;
      iii. beam size; and
      iv. beam shape;
   b. a plurality of portable lighting fixture power supplies adapted to provide adjustable electrical power to the lighting fixtures, each portable lighting fixture power supply housed within a portable cabinet comprising:
      i. a control panel;
      ii. an electrically powered ventilation system; and
      iii. a control board circuit within the control panel;
   c. a first plurality of portable electrical conductors for operatively connecting the lighting fixtures to the lighting fixture power supplies;
   d. a second plurality of portable electrical conductors for operatively connecting the lighting fixture power supplies to a main source of electrical power;
   e. wherein the control panel comprises:
      i. a user interface;
      ii. means for controlling power to the solid-state light sources;
      iii. means for communicating with other control board circuits; and
      iv. allowing:
         a) on or off operation of selected lighting fixtures;
         b) adjustment of electrical power to the solid-state light sources of selected lighting fixtures; and
         c) means for controlling operation of the entire system from a single control panel;
   f. the user interface configured to display:
      i. the lighting characteristics;
      ii. input data; and
      iii. power consumption of the lighting fixtures.

2. The system of claim 1 wherein the lighting fixtures are aimable via operative connection to a framework which is operatively connected to (i) a support structure, (ii) a ground or floor base, or (iii) a clamping or cinching mechanism.

3. The system of claim 1 wherein the main source of electrical power comprises a portable electrical generator.

4. The system of claim 1 wherein the control board circuit is operatively connected to a wireless user interface which includes means for controlling power to the solid-state light sources and allows:
   a. on or off operation of selected lighting fixtures;
   b. adjustment of electrical power to the solid-state light sources of selected lighting fixtures;
   c. such that control of power to the solid-state light sources is effectuated from (i) the user interface, (ii) the wireless user interface, or (iii) both the user interface and the wireless user interface.

5. The system of claim 4 wherein the wireless user interface further comprises at least one display capable of displaying (i) the lighting characteristics, (ii) input data, and (iii) power consumption of the lighting fixtures.

6. The system of claim 4 wherein the control board circuit and wireless user interface are operatively connected by one or more of:
   a. Wi-Fi means;
   b. cellular signal means;
   c. radio frequency means;
   d. infrared radiation means; and
   e. satellite means.

7. A method of on-site simulation, evaluation, or demonstration of a wide range of illumination schemes with a limited number of lighting fixtures and other physical components comprising:
   a. transporting a set of portable lighting fixtures, lighting fixture power supplies, a control panel with a user interface, and lighting fixture mounts to a site to provide on-site evaluation and demonstration of illumination schemes, each lighting fixture with a plurality of solid-state lighting sources, the lighting fixtures having adjustable lighting characteristics including all of:
      i. illumination level;
      ii. color temperature;
      iii. beam size; and
      iv. beam shape;
   b. choosing according to determined criteria all of:
      i. number of lighting fixtures;
      ii. placement and elevation of lighting fixture mounts;

iii. orientation of the lighting fixtures when affixed to mounts;
iv. optical characteristics of the lighting fixtures;
v. input power to the lighting fixtures;
vi. illumination level;
vii. color properties;
viii. beam shape or distribution;
c. installing the lighting fixtures in accordance with step (b) and a main power supply so to produce an initial illumination scheme;
d. operating the lighting fixtures from a location physically remote from the site such that the entire initial illumination scheme is viewable and displaying on the user interface:
i. the lighting characteristics;
ii. input data; and
iii. power consumption of the lighting fixtures;
e. evaluating the choices of step (b), adjusting one or more choices of step (b) to effectuate a different scheme, and comparing the initial and different illumination schemes; and
f. using the comparison of illumination schemes to assist in producing a permanent lighting system.

8. The method of claim 7 further comprising repeating step (e) for still further different illumination schemes.

9. The method of claim 8 further comprising:
a. means for providing feedback for one or more illuminations schemes which includes one or more choices of:
i. location of the lighting fixtures relative to the site;
ii. power consumption of the lighting fixtures;
iii. rated wattage of the lighting fixtures;
iv. operating power of the lighting fixtures relative to the rated wattage;
v. economic cost of owning and/or operating the lighting fixtures;
b. said feedback used, at least in part, in evaluating the choices during operation of the lighting fixtures.

10. The method of claim 9 whereby the choices and/or feedback is used to:
a. define a different illumination scheme;
b. develop a permanent lighting system; and/or
c. used with other software, modeling, or computer programs.

* * * * *